United States Patent
Higuchi

(10) Patent No.: US 7,252,346 B2
(45) Date of Patent: Aug. 7, 2007

(54) BRAKING FORCE CONTROL APPARATUS AND METHOD FOR AUTOMOTIVE VEHICLE

(75) Inventor: Takuya Higuchi, Tokyo (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 265 days.

(21) Appl. No.: 11/138,312

(22) Filed: May 27, 2005

(65) Prior Publication Data

US 2005/0275285 A1    Dec. 15, 2005

(30) Foreign Application Priority Data

Jun. 9, 2004    (JP) ............................. 2004-171547

(51) Int. Cl.
*B60T 8/24* (2006.01)
(52) U.S. Cl. ...................... 303/146; 303/113.1; 701/72
(58) Field of Classification Search ................ 303/146, 303/147, 148, 113.1, 116.1; 701/72
See application file for complete search history.

(56) References Cited

U.S. PATENT DOCUMENTS 6,789,858 B2 *   9/2004   Soejima et al. ............. 303/146
6,868,324 B2    3/2005   Matsumoto et al.
2003/0093208 A1*   5/2003   Hessmert et al. ............. 701/72

FOREIGN PATENT DOCUMENTS

| DE | 101 60 048 A1 | 10/2002 |
| DE | 103 07 947 A1 | 9/2003 |
| EP | 1 110 793 A2 | 6/2001 |
| JP | 2-171373 A | 7/1990 |
| JP | 5-016699 A | 1/1993 |
| JP | 2001-063541 A | 3/2001 |

OTHER PUBLICATIONS

U.S. Appl. No. 11/144,610, filed Jun. 6, 2005, Higuchi et al.
U.S. Appl. No. 11/143,573, filed Jun. 3, 2005, Ishimoto.

* cited by examiner

*Primary Examiner*—Thomas Williams
(74) *Attorney, Agent, or Firm*—Foley & Lardner LLP

(57) ABSTRACT

In brake control apparatus and method for an automotive vehicle, a cornering stability control section is configured to start a provision of the braking force for the vehicle when a cornering limit estimating section estimates that a cornering state variable of the vehicle (Vp) is in excess of the braking operation threshold value (kVLp) after the predetermined delay time ($\Delta t$) is elapsed from a present time.

22 Claims, 15 Drawing Sheets

BRAKING FORCE CONTROL APPARATUS AND METHOD FOR AUTOMOTIVE VEHICLE

BACKGROUND OF THE INVENTION

1. Field of the Invention

The present invention relates to braking force control apparatus and method for an automotive vehicle which enable the vehicle to perform a stable cornering.

2. Description of the Related Art

A Japanese Patent Application First Publication (Tokkai) Heisei 2-171373 published on Jul. 3, 1990 exemplifies a first previously proposed vehicular braking force control apparatus which has a purpose of securing a stability of a vehicular cornering. In this first previously proposed braking force control apparatus, as a traction control, with an acceleration slip of a driven wheel detected, the acceleration slip is not merely suppressed but a vehicular cornering state variable is detected from a driving state of the vehicle, in a case where the detected cornering state variable approaches to a predetermined braking operation threshold value which has a predetermined margin for a cornering limit state variable up to which the vehicle is enabled to travel stably, a target deceleration required to maintain a stable cornering of the vehicle is calculated, and a braking force to achieve the target deceleration is provided for the vehicle.

Thus, as a result of the control in such a way that the vehicle is controlled so as not to exceed the limit cornering state variable up to which the vehicle is stably enabled to corner during the vehicular cornering irrespective of an intention of the driver, quick and appropriate vehicular deceleration is carried out so that the vehicular stability can be secured even if the vehicle enters a sharp corner having a small radius of curvature at an excessively high speed contrary to the driver's expectation. However, for example, a liquid pressure brake apparatus which provides a braking force for each of road wheels is supposed as an actuator which provides the braking force for the vehicle. In, so-called, a pump-up system which includes a liquid pressure brake actuator in which a motor pump is equipped as a pressure generating source of the liquid pressure brake apparatus, a time is required from a time at which the braking force control is started to be operated to a time at which the motor pump is operated and a brake liquid pressure is raised within each of wheel cylinders. Therefore, an initial responsive characteristic becomes delayed. To solve this problem of the delayed initial responsive characteristic, a second previously proposed vehicular braking force control apparatus as disclosed in a Japanese Patent Application First Publication (Tokkai) No. 2001-63541 published on Mar. 13, 2001 has been proposed in which a technique of a pre-pressure application is used.

SUMMARY OF THE INVENTION

However, when, with a second operation threshold value set which is lower than a first operation threshold value which is a target, an output value from braking determining means is determined to be a state between the second operation threshold value and the first operation threshold value, a pre-pressure control is executed. At this time, in a case where a variation of the output value of braking determining means is quick, the output value is often in excess of the first operation threshold value without a sufficient time for the pre-pressure application even when the state is transferred to the pre-pressure control from a time at which the output value is determined to be in excess of the second operation threshold value. In such a case as described above, an effect of the pre-pressure control is sufficiently obtained and there is a possibility that the required initial control responsive characteristic cannot be obtained.

It is, therefore, an object of the present invention to provide braking force control apparatus and method for an automotive vehicle which can perform the braking force control for the cornering stability and can improve the initial (control) responsive characteristic.

According to one aspect of the present invention, there is provided a braking force control apparatus for an automotive vehicle, comprising: a cornering stability control section that calculates a target deceleration required to maintain a vehicular stability cornering when determining that a cornering state variable of the vehicle is in excess of a braking operation threshold value which has a slight margin for a limit cornering state variable up to which the vehicle is enabled to travel stably and provides a braking force in accordance with the target deceleration for the vehicle; and a cornering limit estimating section that estimates whether the cornering state variable of the vehicle is in excess of the braking operation threshold value after a predetermined delay time is elapsed from a present time, the cornering stability control section being configured to start a provision of the braking force for the vehicle when the cornering limit estimating section estimates that the cornering state variable of the vehicle is in excess of the braking operation threshold value after the predetermined delay time is elapsed from the present time.

According to another aspect of the present invention, there is provided a braking force control method for an automotive vehicle, comprising: calculating a target deceleration required to maintain a vehicular stability cornering, and in accordance with which a braking force is provided when determining that a cornering state variable of the vehicle is in excess of a braking operation threshold value which has a slight margin for a limit cornering state variable up to which the vehicle is enabled to travel stably; estimating whether the cornering state variable of the vehicle is in excess of the braking operation threshold value after a predetermined delay time is elapsed from a present time; and starting to provide the braking force for the vehicle when estimating that the cornering state variable of the vehicle is in excess of the braking operation threshold value after the predetermined time is elapsed from the present time.

According to the present invention, an initial response characteristic of control is improved and it becomes possible for the vehicle to be decelerated to the vehicle speed at which the vehicle can stably be cornered. This summary of the invention does not necessarily describe all necessary features so that the invention may also be a sub-combination of these described features.

DETAILED DESCRIPTION OF THE PREFERRED EMBODIMENTS

Reference will hereinafter be made to the drawings in order to facilitate a better understanding of the present invention.

Figure 1:
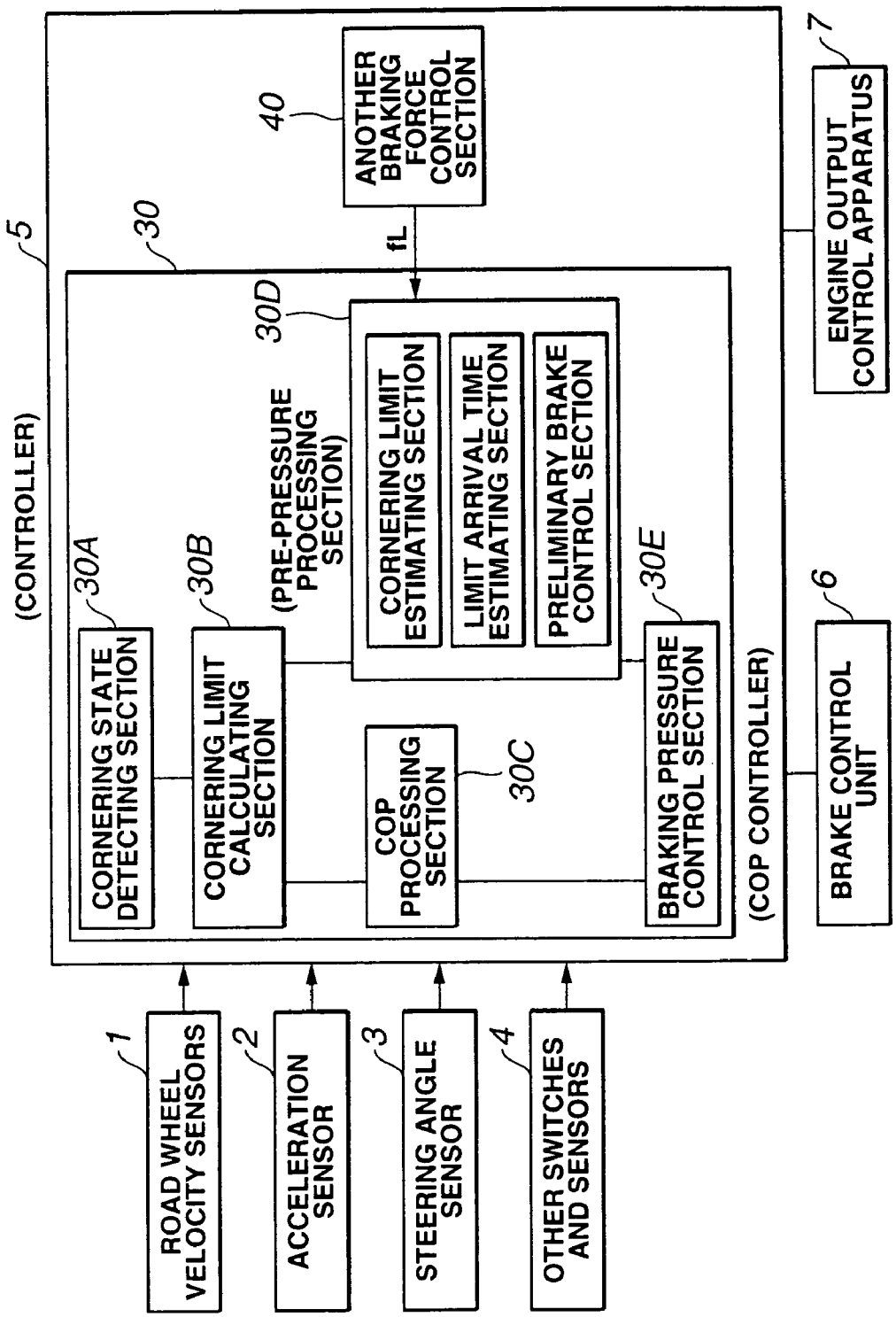
FIG. 1 is a schematic view representing a system configuration of a braking force control apparatus for an automotive vehicle in a first preferred embodiment according to the present invention.

FIG. 1 shows a first preferred embodiment of a braking force control apparatus for an automotive vehicle according to the present invention. At first, road wheel velocities of front and rear respective road wheels are detected by means of road wheel velocity sensors 1. Detection signals of road wheel velocity sensors 1 are inputted to a controller 5. Various detection signals from an acceleration sensor 2 to detect vehicular longitudinal and lateral accelerations, a steering angle sensor 3 to detect a steering angle of a steering wheel of the vehicle, a switch group of brake switch, pressure switch, and accelerator switch, and a liquid pressure sensor to detect the liquid pressure of each wheel cylinder are inputted to controller 5. Controller 5 performs a calculation processing on the basis of various input signals from each sensor and switches and outputs control signals to a brake control unit 6 which adjusts the brake pressure for front and rear road wheels and to an engine output adjuster 7 to adjust an engine output.

Figure 2:
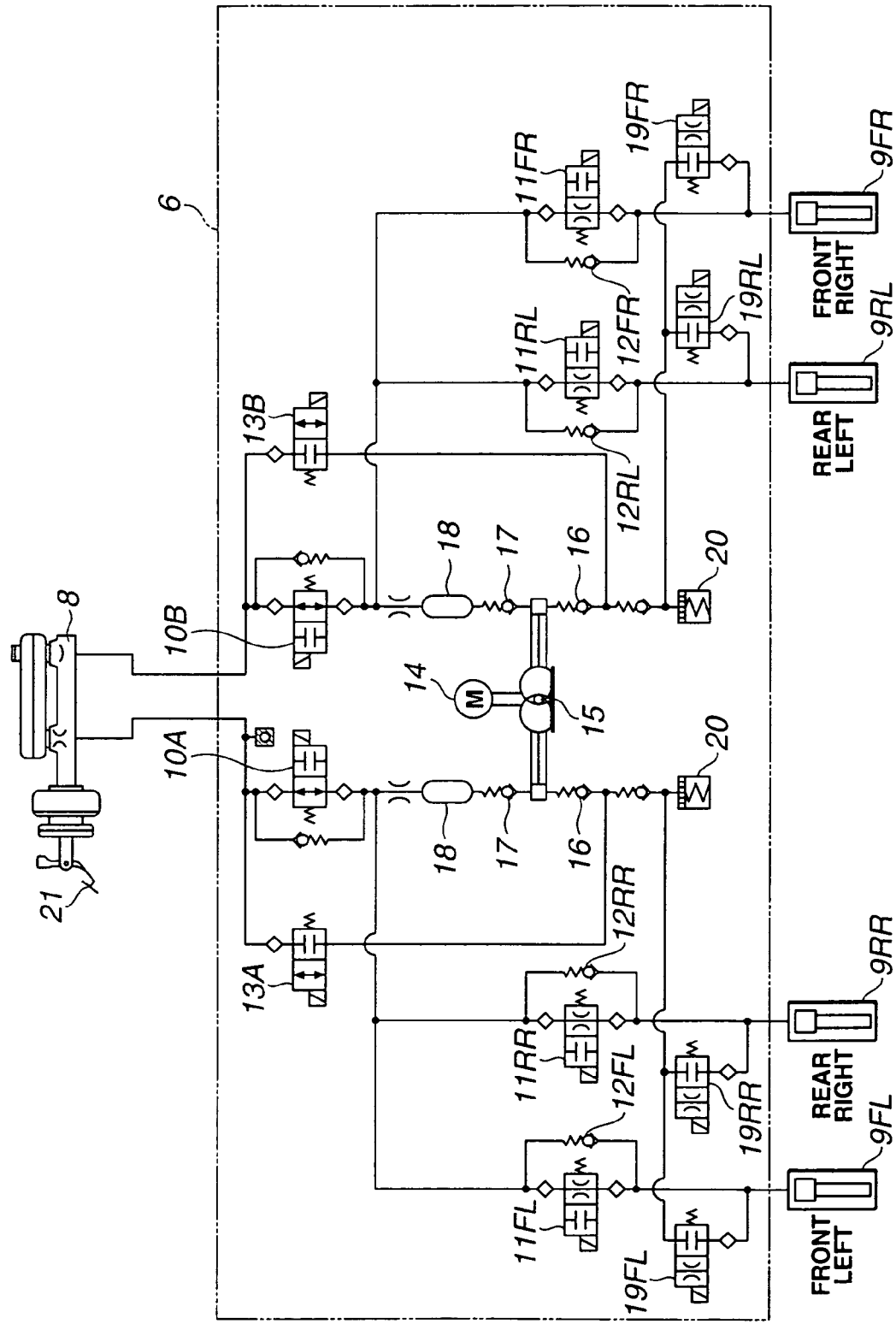
FIG. 2 is a schematic view representing a system configuration of a liquid pressure system in the braking force control apparatus in the first embodiment shown in FIG. 1.

Next, a structure example of brake control unit 6 will be described on the basis of FIG. 2. In FIG. 2, a reference numeral 21 denotes a brake pedal and a reference numeral 8 denotes a master cylinder. In addition, reference numerals of 9FL, 9FR, 9RL, and 9RR denote wheel cylinders of a liquid pressure brake unit installed on respective road wheels FL, FR, RL, and RR. Pressure switching valves and other valves intervened between master cylinder 8 and wheel cylinders 9FL, 9FR, 9RL, and 9RR are controlled so that, irrespective of the brake operations of the driver, the braking liquid pressure of each wheel cylinder can be increased, held, and decreased.

That is to say, master cylinder 8 is linked to front left and rear right wheel cylinders 9FL, 9RR via normal open type pressure switching valve 10A and normal open type inlet solenoid valves 11FL, 11RR. Master cylinder 8 is linked to front right and rear left wheel cylinders 9FR, 9RL via normal open type inlet solenoid valves 11FR, 11RL. Return check valves 12FR, 12RL are disposed on respective inlet solenoid valves 11FR, 11RL for returning the braking liquid pressures of respective wheel cylinders 9FR, 9RL to master cylinder 8. Furthermore, master cylinder 8 is linked to a downstream side (wheel cylinder side) of pressure switching valve 10A via normal close type pressure switching valve 13A and linked to a downstream side (wheel cylinder side) of pressure switching valve 10B via normal close type pressure switching valve 13B. A common pump 15 is intervened between pressure switching valves 10A and 13A and between switching control valves 10B and 13B with pressure switching valves 13A and 13B as a suction side. This pump 15 is driven by an electric motor 14. An inlet valve 16 is interposed at a suction side of pump 15 to block a revere flow of the sucked fluid and an outlet valve 17 is interposed at a drain (discharge) side of pump 15 to block a reverse flow of the discharged fluid. A damper chamber 18 is disposed in series with outlet valve 17 to suppress a ripple of liquid pressure drained from pump 15.

Front left and rear right wheel cylinders 9FL, 9RR are linked to a downstream side (pump side) of pressure switching valve 13A via normal close type outlet solenoid valves 19FL, 19RR. Front right and rear left wheel cylinders 9FR, 9RL are linked to the downstream side (pump side) of pressure switching valve 13B via normal close type outlet solenoid valves 19FR, 19RL. Reservoirs 20, 20 are disposed to temporarily store the braking liquid pressures from wheel cylinders 9FR, 9RL on upstream sides of outlet solenoid valves 19FL, 19RR (pressure switching valve 13A side) and upstream sides of outlet solenoid valves 19FR, 19RL (pressure switching valve 13B side) in order to effectively perform this pressure decrease with high accuracy during the pressure decrease of each wheel cylinder 9FR, 9RL.

In the above-described construction, when brake control unit 6 supplies a normal braking liquid pressure in accordance with the brake operation of the driver to respective wheel cylinders via pressure switching valves 10A, 10B, and inlet solenoid valves 11FL, 11RR when pressure switching valves 10A, 10B, pressure switching valves 13A, 13B, inlet solenoid valves 11FL, 11RR, and outlet solenoid valves 19FL, 19RR are in a non-power supply state.

In addition, when pressure switching valves 10A, 10B and pressure switching valves 13A, 13B are in the power supply state and pump 15 is operated, the braking liquid pressure sucked from master cylinder 8 via pressure switching valves 13A, 13B is supplied to each wheel cylinder via inlet solenoid valves 11FL through 11RR and pressure in each wheel cylinder is increased. When pressure switching valves 10A and 10B and inlet solenoid valves 11FR through 11RR are in the power supply state, each wheel cylinder, pump 15, and reservoirs 20 are interrupted and the braking liquid pressure of each wheel cylinder is held (in a hold state). When the power supply of pressure switching valves 10A, 10B, inlet solenoid valves 11FR through 11RR, and the power supply to inlet solenoid valves 11FL through 11RR, and outlet solenoid valve 19FR through 19RR are respectively in the power supply state and pump 15 is operated, the braking pressure of each wheel cylinder is sucked into reservoirs 20 and the pressure of each wheel cylinder is decreased.

Hence, if the power supply to pressure switching valves 10A, 10B, pressure switching valves 13A, 13B, inlet solenoid valves 11FL through 11RR, and outlet solenoid valves 19FL through 19RR is controlled and pump 15 is drivingly controlled, the braking liquid pressure of each wheel cylinder 9FL through 9RR can be increased, held, and decreased. In addition, engine output control apparatus 7 of engine shown in FIG. 1 is constructed to output an engine output by adjusting the opening angle of, for example, a throttle valve.

Next, controller 5 will be described below. Controller 5 includes: a COP (an abbreviation for a Cornering Overspeed Prevention) controller 30 constituting a cornering stability control section; and another braking force control section 40 which performs a braking control by means of another brake control such as a TCS (Traction Control System) control, ACC (Adaptive Cruise Control)(or Inter-vehicle distance control), or other braking force control section (refer to FIG. 1). COP controller 30 includes: a cornering state detecting section 30A, a cornering limit calculating section 30B, COP processing section 30C, a pre-pressure processing section 30D, and a braking pressure control section 30E.

Figure 3:
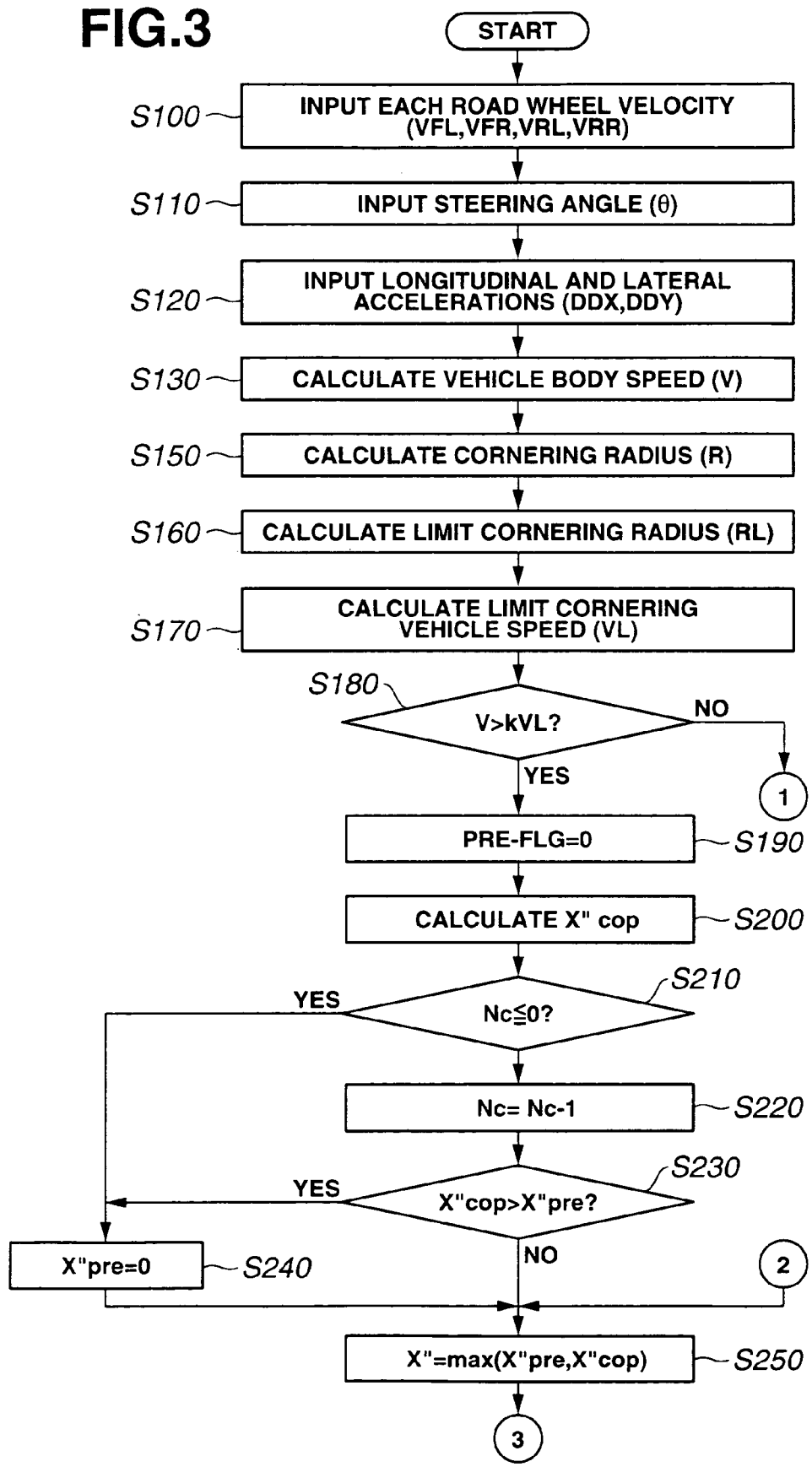
FIG. 3 is a part of a processing flow executed by a COP controller shown in FIG. 1.
Figure 4:
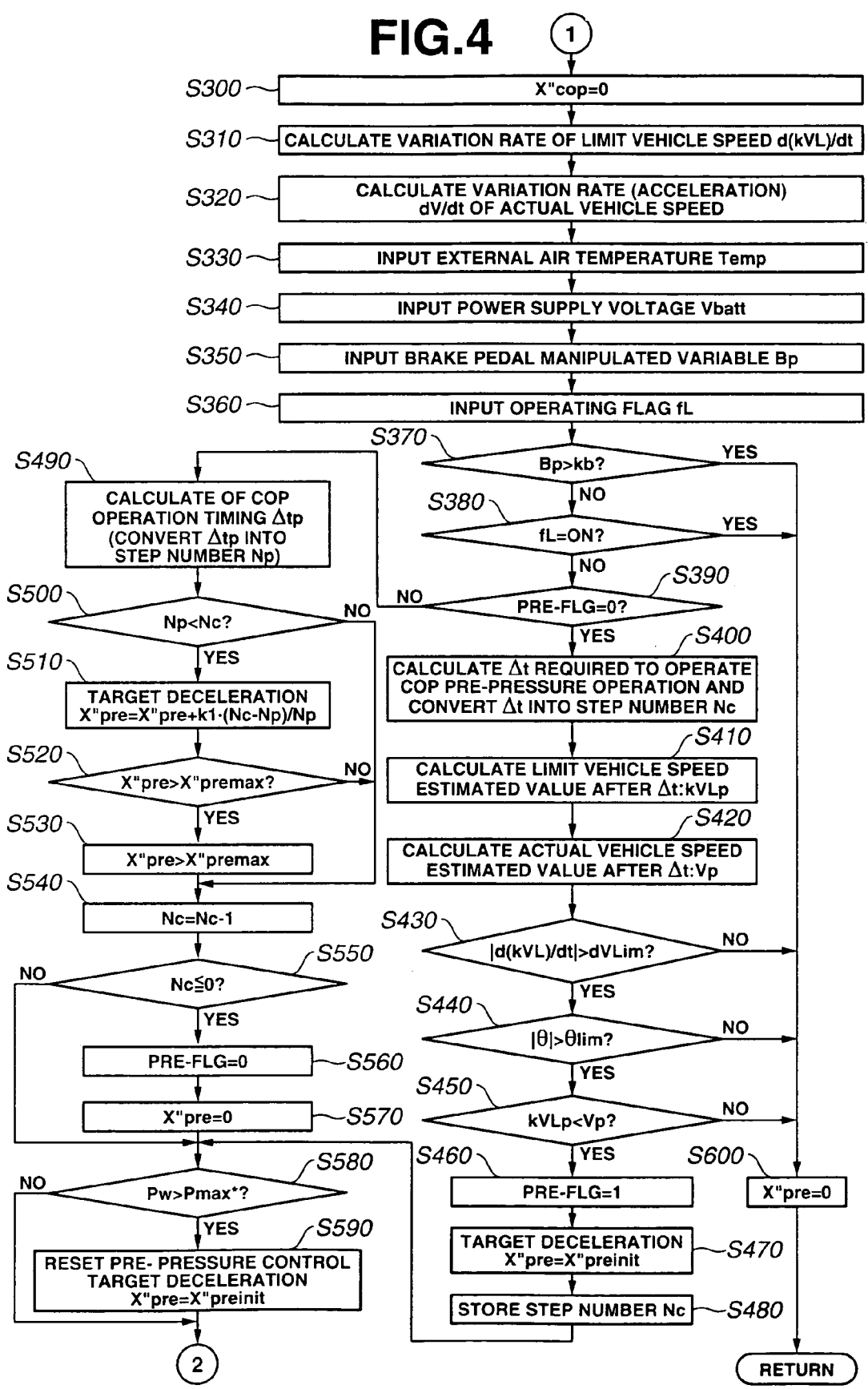
FIG. 4 is a part of a processing flow executed by the COP controller shown in FIG. 1.
Figure 5:
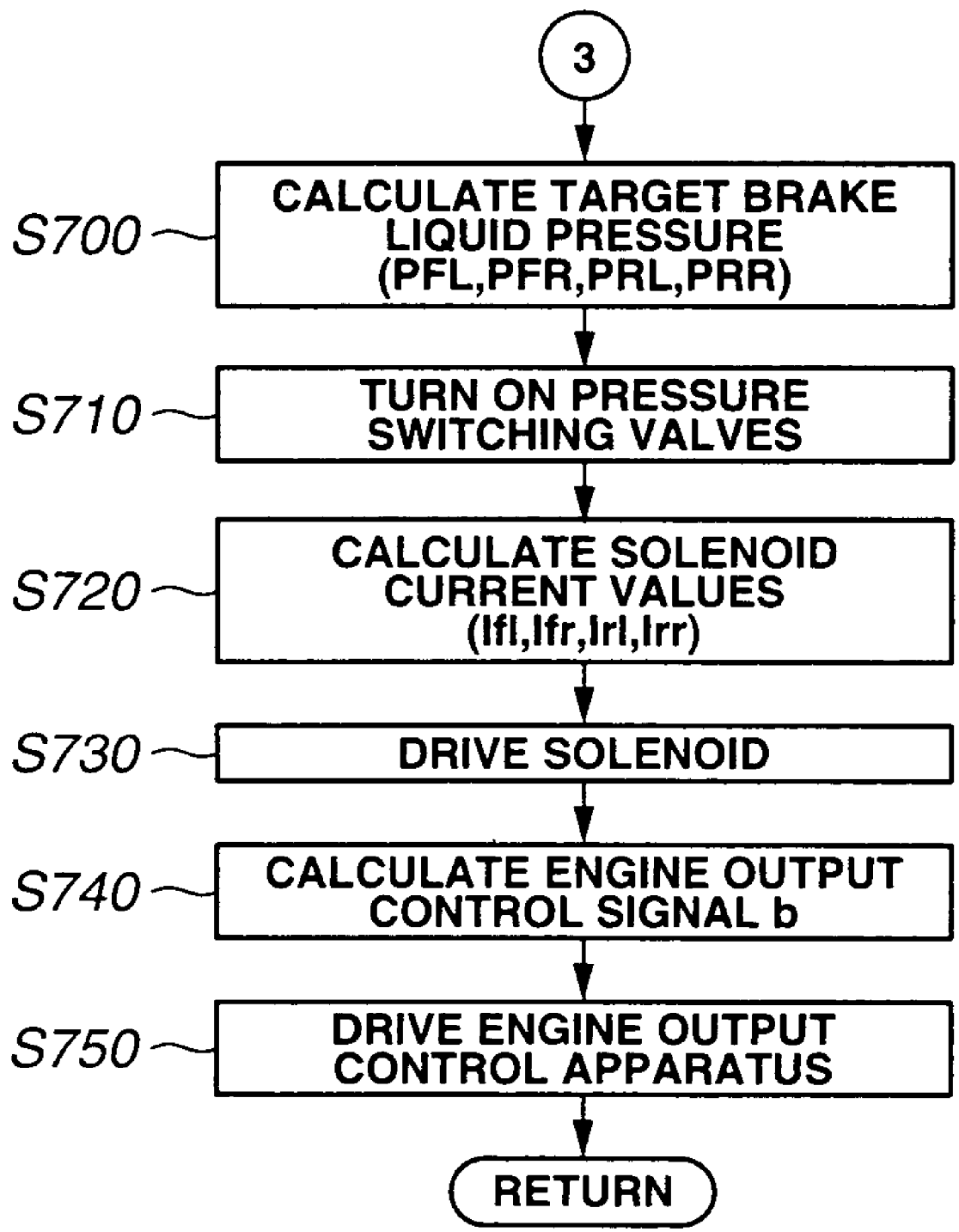
FIG. 5 is a part of a processing flow executed by the COP controller shown in FIG. 1.

In addition, another braking force control section 40 outputs an operation flag fL=ON to COP controller 30 during the operation of the braking control using brake control unit 6. A processing executed by COP controller 30 will be described with reference to a processing flow integrally shown in FIGS. 3 through 5. This control processing shown in FIGS. 3 through 5 is executed for each predetermined control period, for example 10 milliseconds. At first, at a step S100, COP controller 30 inputs road wheel velocities VFL, VFR, VRL, and VRR for the respective road wheel velocity sensors 1. It is noted that FL denotes a front left road wheel, FR denotes a front rear road wheel, RL denotes a rear left road wheel, and RR denotes a rear right road wheel. At a step S110, COP controller 30 inputs a steering wheel angle θ. At a step S120, COP controller 30 inputs vehicular longitudinal and lateral accelerations DDX and DDY. At a step S130, COP controller 30 calculates a vehicle body velocity V from respective road wheel velocities VFL, VFR, VRL, VRR, and vehicle body longitudinal acceleration and the routine goes to a step S150.

At a step S150, a cornering radius R is calculated from vehicle body speed (velocity) V and vehicle body lateral acceleration DDY on the basis of the following equation:

$$R=(V^2/DDY)$$

At a step S160, COP controller 30 derives a limit cornering radius RL at the present vehicle body speed V from vehicle body speed V. For example, when a limit vehicle body lateral acceleration determined according to the vehicle is assumed as DDY1, limit cornering radius RL can be derived as:

$$RL=(V^2/DDY1)$$

It is noted that the above-described limit vehicle body lateral acceleration DDY1 may be varied in accordance with a slip rate of the respective road wheels. At step S170, COP controller 30 derives limit cornering speed VL at the present cornering radius R and the routine goes to a step S180.

$$VL=\sqrt{(R \cdot DDY1)}$$

It is noted that limit vehicle body lateral acceleration DDY1 at the above-described limit vehicle body lateral acceleration DDY1 may be varied in accordance with the slip rate of each road wheel. In addition, steps S100 through S150 constitute cornering state detecting section 30A and steps S100 through S150 constitute cornering limit calculating section 30B.

At a step S180, COP controller 30 determines whether a cornering stability control (hereinafter, also called, COP) is to be operated, namely, determines whether actual vehicle speed (actual vehicular velocity) V is in excess of a target vehicle speed kVL (k<1, for example, k=0.9) which is a braking operation threshold value which is slightly smaller than limit cornering speed VL. If actual vehicular velocity V is in excess of kVL (Yes) at step S180, COP controller 30 determines that COP control is to be operated and the routine goes to a step S190. If actual vehicle speed V is equal to or below kVL (No), the routine goes to a step S300 (refer to FIG. 4) in order to determine whether a pre-pressure control for COP should be carried out.

First, a case where the COP is determined to be operated (in a case where step S180 is established) will be described below. At the next step S190, COP controller 30 resets a COP pre-pressure operation flag PRE-FLG to "0". Then, the routine goes to a step S200. It is noted that this COP pre-pressure operation flag PRE-FLG is set at a step S460 in a case where the pre-pressure control is operated, is reset at step S190 when COP is operated, or reset at step a S560 when set time Δt is elapsed. At step S200, COP controller 30 calculates a target deceleration X"cop for COP on the basis of vehicle body speed (velocity) V, limit vehicle body speed (velocity) VL, cornering radius R, and limit cornering (turning) radius RL. At a step S210, COP controller 30 determines whether a predetermined time Δt is elapsed from a start of a COP pre-pressure control (or a preliminary brake control). In this embodiment, COP controller 30 determines whether a count value of a counter Nc becomes equal to or smaller than "0".

If predetermined time Δt is elapsed (Yes at step S210), target deceleration X"pre of COP pre-pressure control is reset to "0" (at a step S240). and the routine goes to a step S250. On the other hand, if predetermined time Δt is not elapsed (No) at step S210, the routine goes to a step S220 at which the value of counter Nc is counted down (decremented) by one. Then, the routine goes to a step S230. At step S230, COP controller 30 compares target deceleration X"pre with target deceleration X"cop for COP. If a magnitude of target deceleration X"cop is larger than that of target deceleration X"cop for COP, the routine goes to step S240 at which target deceleration X"pre of the pre-pressure control is reset to "0". Thereafter, the routine goes to S250. If X"cop≦X"pre (No) at step S230, the routine goes to step S250.

At step S250, COP controller 30 performs a select high between target deceleration X"pre of COP pre-pressure control and target deceleration X"cop of COP to determine a final target deceleration X" (X"=max(X"pre, X"cop)). Then, the routine goes to a step S700 (refer to FIG. 5). On the other hand, if COP controller 30 determines that COP is not carried out at step S180, the routine goes to a step S300 shown in FIG. 4 at which target deceleration X"cop for COP is reset to "0" and the routine goes to the next step S310.

At step S310, COP controller 30 calculates a time variation rate d(kVL)/dt of braking operation threshold value kVL and the routine goes to a step S320. At step S310, with the previous braking operation threshold value before one control period stored, a difference between the present braking operation threshold value and the braking operation threshold value before one control period is calculated. If the control period is sufficiently short, a weighting using the further previous values may be calculated. In addition, a, so-called, low pass filter may alternatively be applied thereto.

At step S320, COP controller 30 calculates variation rate dV/dt of actual vehicle speed V. At a step S330, COP controller 30 inputs an external (vehicular outside) air temperature Temp at step S330. Furthermore, at step S340, power supply voltage Vbatt is inputted which supplies an electric power to brake control unit 6. Then, at step S350, a manipulated variable Bp of brake pedal 21 is inputted and the routine goes to a step S360. In this embodiment, a master cylinder liquid pressure is used as brake manipulated variable Bp. At step S360, COP controller 30 inputs operation flag fL to determine whether the other braking force control section 40 such as an automatic inter-vehicle distance control apparatus (so-called, ACC (Adaptive Cruise Control)) is activated to provide the braking force for the vehicle and the routine goes to a step S370. At step S370, COP controller 30 determines whether brake pedal 21 is operated depending upon whether present master cylinder liquid pressure Bp is in excess of a predetermined value kb. This liquid pressure kb is a minimum liquid pressure that is detectable that the brake liquid is filled within master cylinder 8 but may be the liquid pressure having a margin by a value at which an influence of noise is not affected in a case where an erroneous operation of the liquid pressure sensor occurs due to the noise in the liquid pressure sensor. However, the determination of whether brake pedal 21 is operated may be carried out by means of a well known brake lamp switch. If brake pedal 21 is operated (Yes) at step S370, the pre-pressure control of COP is not carried out. Then, the routine goes to a step S600 at which target deceleration X"pre for the COP pre-pressure control is reset to "0" and the present routine is returned to the start position. On the other hand, if COP controller 30 determines that the operation of brake pedal 21 is not carried out, the routine goes to a step S380.

At step S380, COP controller 30 determines whether operation flag fL inputted at step S360 is in an ON state or not. If operation flag fL is ON (Yes), the pre-pressure control for COP is not carried out. Then, the routine goes to step S600. On the other hand, if COP controller 30 determines that operation flag fL is in an OFF state, in other words, other braking force control section 40 is not operated, the routine goes to a step 390.

At step S390, COP controller 30 determines whether COP pre-pressure operation flag PRE-FLG is zero or not. If operation flag PRE-FLG is in the zero state, the pre-pressure control of COP is not yet carried out and the routine goes to a step S400. If the pre-pressure control is being operated (No) at step 390, the routine goes to a step S490.

At first, a case where COP pre-pressure control is not yet operated will be described below. At step S400, COP controller 30 calculates time Δt for COP pre-pressure control to be previously operated before the operation of COP and the routine goes to a step S410. This time Δt corresponds to a delay time and is set to a time sufficient for the wheel cylinder pressures to be raised without delay. Specifically, a time for the brake liquid to be filled in each wheel cylinder with an initial target deceleration X"pre of COP pre-pressure control as a command value, a time for each wheel cylinder to be filled within the brake liquid pressure is measured. This time is, in this embodiment, Δt–init.

Figure 6:
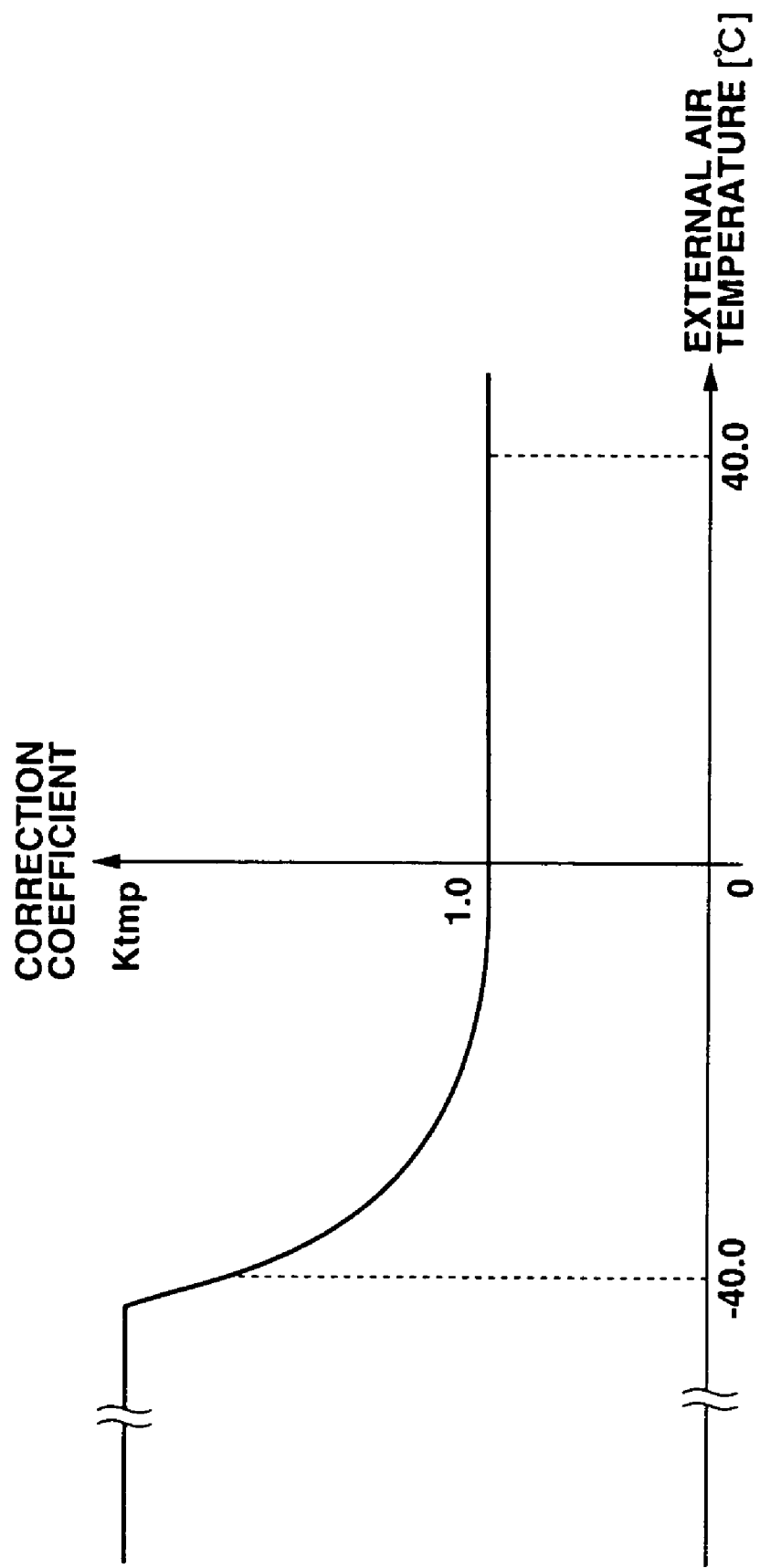
FIG. 6 is a graph representing a relationship between an external (vehicular outside) temperature and its correction coefficient.
Figure 7:
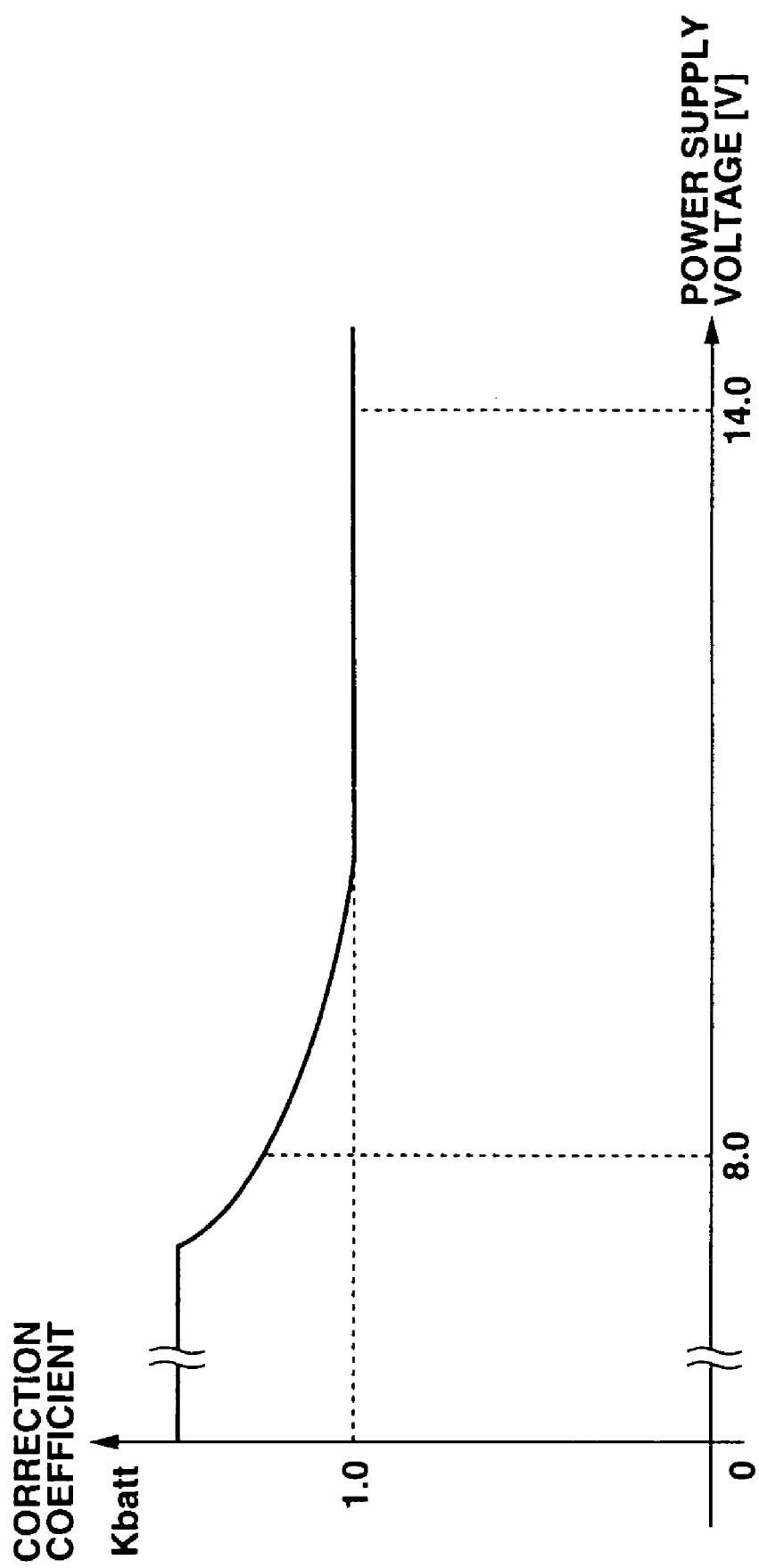
FIG. 7 is a graph representing a graph representing a relationship between a power supply voltage and its correction coefficient.

Time Δt of pre-pressure control is a time after a correction by the vehicular outside (external) air temperature inputted at step S330 and the correction by the power supply voltage inputted at step S340. Correction coefficients prescribed by maps shown in FIGS. 6 and 7 are provided for vehicular outside air (external) temperature and power supply voltage. The correction is carried out by multiplying correction coefficients Ktmp, Kbatt by Δt–init. As shown in the following equation, the correction is carried out by multiplying (Δt–init) by these correction coefficients Ktmp and Kbatt. Vehicular outside temperature coefficient of correction coefficient Ktmp is determined on the basis of a viscosity with a temperature of the brake fluid as a function. Correction coefficient Kbatt is determined on the basis of a driving resistance of such as the motor.

$$\Delta t = (\Delta t - init) \times Ktmp \times Kbatt$$

Since this time Δt is handled within a logic as the number of steps, time Δt is converted by dividing time Δt by the control period into step numbers of Nc. For example, suppose that time Δt is 250 milliseconds and the control period is 10 milliseconds. In this case, Nc=25. At step S410, COP controller 30 calculates braking operation threshold value kVLp after time Δt and the routine goes to a step S420.

$$kVLp = kVL + d(kVL)/dt \times \Delta t$$

At step S420, actual vehicle speed Vp after time Δt is calculated on the basis of the following equation and the routine goes to a step S430.

$$Vp = V + dV/dt \times \Delta t$$

At step S430, COP controller 30 determines whether an absolute value of the variation speed of the braking operation threshold value is in excess of a certain threshold value dVlim. This is because, in a case where the vehicle is traveling maintaining the vicinity to the braking operation threshold value of COP, frequent repetitive ON and OFF of COP pre-pressure control is prevented. If the absolute value of the variation speed of the control operation threshold value is smaller than dVlim, the pre-pressure control is not operated and the routine goes to step S600. On the other hand, if the variation speed of the braking operation threshold value is equal to or larger than dVlim, the routine goes to a step S440.

At step S440, COP controller 30 determines whether the absolute value of steering angle |θ| is larger (wider) than a predetermined steering angle θlim. If absolute value of steering angle θ is equal to or smaller than θlim, the pre-pressure control is not operated and the routine goes to step S600. On the other hand, if absolute value of steering angle |θ| is larger (wider) than θlim, the routine goes to step S450. At step S450, COP controller 30 determines whether the pre-pressure control of COP should be operated. That is to say, in a case where vehicle speed Vp after time Δt is estimated to be in excess of braking operation threshold value kVLp after time Δt, COP controller 30 determines that it is necessary to operate the pre-pressure control of COP and the routine goes to S460. If COP controller 30 determines that it is not necessary to operate the pre-pressure control and the routine goes to step S600. Then, the pre-pressure control is not operated and the routine is returned to the start position.

At a step S460, COP controller 30 sets COP pre-pressure operation flag PRE-FLG to "1". Then, at a step S470, COP controller 30 sets X"preinit as an initial value to target deceleration X"pre of pre-pressure control and the routine goes to a step S480. It is noted that steps S310 through S450 constitute a cornering limit estimating section (means). At step S480, COP controller 30 stores the count value of counter Nc and the routine goes to a step S580 (the explanation after step S580 will be described later).

On the other hand, if COP controller 30 determines that the pre-pressure control of COP is already operated, the routine goes from step S390 to step S490. At step S490, COP controller 30 calculates after what second it is predicted that the COP is operated (the vehicle speed is in excess of braking operation threshold value) from the present step in the present vehicular state from the variation rate d(kVL)/dt of braking operation threshold value kVL and the variation rate dV/dt of actual vehicle speed. Then, the routine goes to a step 500. This calculated time is assumed to be Δtp. This time Δtp is determined on the basis of the following equation.

$$\Delta tp = (Vp - kVL)/(dkVL/dt - dV/dt)$$

Since, in the same way as time Δt, this Δtp is handled as the step number in the control logic, Δtp is divided by the control period to be converted into Np. For example, in the case where Δtp is 40 milliseconds and the control period is 10 milliseconds, Np=4. This step S490 constitutes a limit arrival time estimating section (means). At step S500, COP controller 30 compares the above-derived Np with the present Nc. If Np<Nc at step S500, it is a case where the COP is operated at a time earlier than initially predicted time Δt and the routine goes to a step S510. At step S510, COP controller 30 corrects target deceleration X"pre of the pre-pressure control. On the other hand, if Np≧Nc at step S500, the routine goes to a step S540. At step S510, after target deceleration X"pre is enlarged in accordance with a relationship between Nc and Np, the routine goes to a step S520. Thus, a command value (controlled variable) of a pre-pressure application becomes large. Then, a pressure boosting speed becomes fast. That is to say, a drive current of motor 14 becomes large and it becomes possible to quickly fill the brake liquid into each wheel cylinder.

$$X''pre = X''pre + k1 \times (Nc - Np)/Np, \text{ wherein}$$

k1 denotes a weighting coefficient. However, it is possible to enlarge target deceleration X"pre by multiplying target deceleration X"pre by (Nc/Np).

Next, if, at steps S520 and S530, target deceleration X"pre is in excess of a limiter X"premax, target deceleration is changed to the value of limiter X"premax. This limiter X"premax is a value corresponding to a maximum deceleration having a magnitude to be estimated that the deceleration is not felt by the driver. At this step S540, COP controller 30 counts down Nc (Nc=Nc-1) as a remaining number of steps until a COP operation start schedule and the routine goes to a step S550.

At a step S550, COP controller 30 determines whether set time Δt has passed from the time of start of the pre-pressure control. Specifically, COP controller 30 determines whether Nc is counted down to 0 or below. If Nc is equal to zero or below zero, COP controller 30 determines that set time Δt has passed and the routine goes to a step S560. At step S560, COP pre-pressure control flag is reset to zero. At step S570, target deceleration X"pre is reset to zero. If set time Δt is not passed, the routine goes to a step S580. For example, if the control period is 10 milliseconds and Δt (=250 milliseconds)+10 milliseconds×125 milliseconds=about 1500 milliseconds) has passed, the set time has passed.

At step S580, COP controller 30 determines whether the magnitude of each wheel cylinder liquid pressure Pw (or wheel cylinder liquid pressure estimated value) generated by the pre-pressure control is larger than a set value Pmax*. If the wheel cylinder liquid pressure generated according to the pre-pressure control (or wheel cylinder liquid pressure estimated value) is larger than Pmax* (Yes) at step S580, the routine goes to step S590 at which target deceleration X"pre of the pre-pressure control is reset to initial value of X"preinit. This set value Pmax* is a liquid pressure value at which a brake pad of each brake unit is contacted with a rotor without transmission of a force. It is noted that the liquid pressure of each brake unit is made equal to each other.

As described above, at step S250 in FIG. 3, COP controller 30 performs the select high between COP target deceleration X"cop with target deceleration X"pre of the pre-pressure control and calculates final target deceleration X", and the routine goes to a step S700 in FIG. 5.

At step S700, COP controller 30 determines each target brake liquid pressure of front left and right and rear left and right road wheels to obtain target deceleration X". At the next step S710, all pressure switching valves 10A, 10B, 13A, 13B are turned to ON. At step S720, COP controller 30 calculates a drive variable of motor 14 and current values of respective solenoids and outputs drive commands to brake control unit 6 at step S730.

At the next step S740, COP controller 30 calculates an engine output control signal to obtain target deceleration X" if pre-pressure control operation flag PRE-FLG is turned off. For example, in a case where the engine output is controlled by means of a throttle opening angle, a target throttle opening angle is determined with a relationship between the deceleration obtained by the brake taken into consideration and engine output control apparatus 7 is driven at step S300. In the above-described example, the throttle (valve) is driven.

Next, action, operation, and advantages of the braking force control apparatus in the first embodiment described above will be described below. When the vehicle is running on a curved road and a vehicle cornering state becomes near to a limit cornering state, COP is operated and the vehicle is automatically decelerated. Thus, during the vehicle cornering, the vehicle is controlled so as not to exceed a limit such that the vehicle can stably be cornered irrespective of an intention of a vehicle driver. Consequently, even if, contrary to the expectation of the driver, the vehicle enters a corner at an excessively high speed, the radius of curvature of the corner being small (so-called, a sharp curved road), an appropriate vehicular deceleration is carried out and the vehicle stability is assured.

Figure 8:
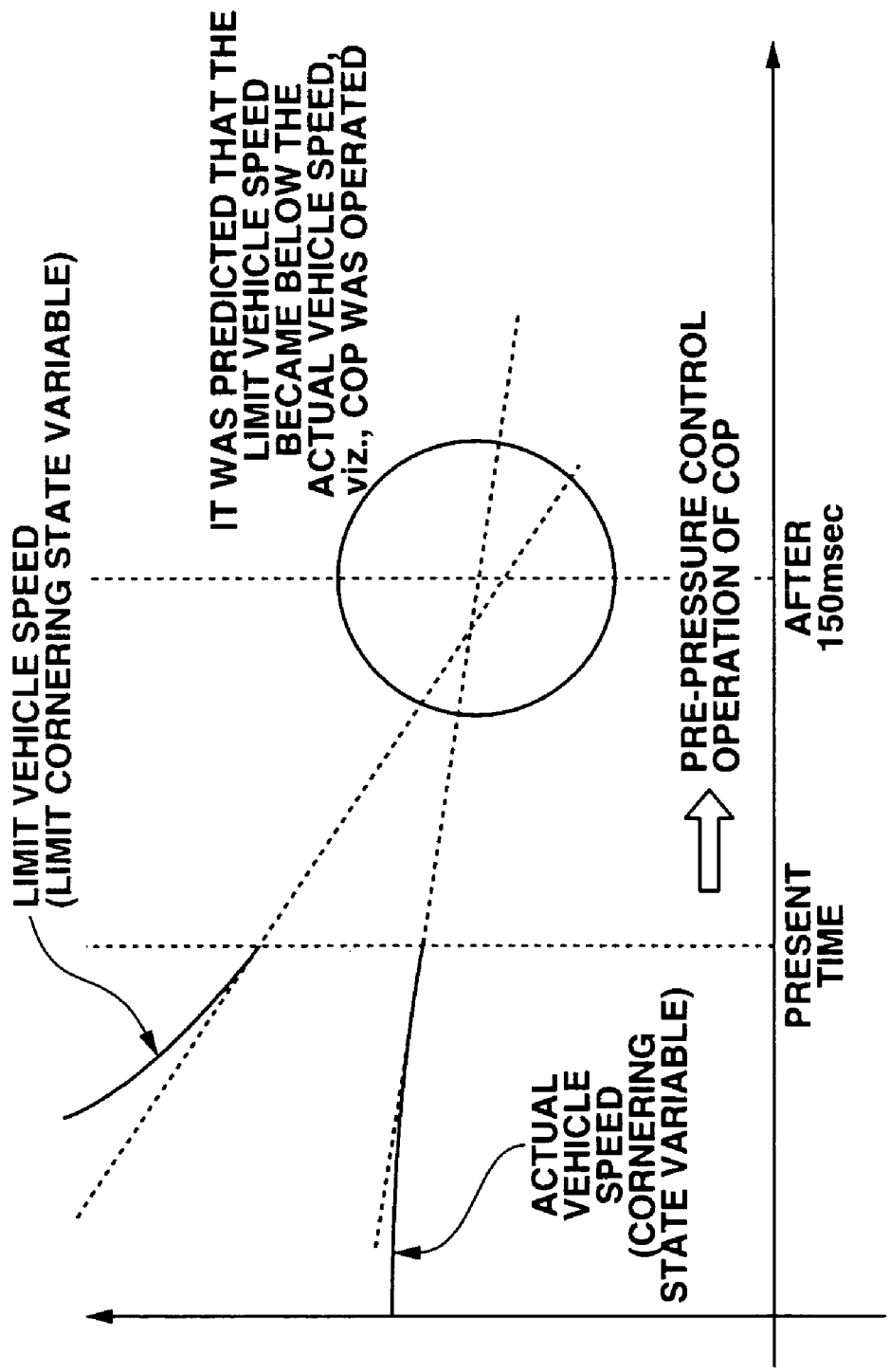
FIG. 8 is an example of a timing chart for explaining an operation of the braking force control apparatus in the first embodiment.

At this time, an initial delay (lag) time is present until the deceleration is enabled to be effectively generated by the COP (until pressure boost is enabled). In order to reduce this delay time and to improve the initial responsive characteristic, in this embodiment, the pre-pressure control is carried out. In the pre-pressure control in this embodiment, the threshold value for the start of the pre-pressure is not simply set for brake operation threshold value kVL but delay time Δt is supposed which can be secured for the aimed pre-pressure to be transferred to the COP. As shown in FIG. 8, when an actual cornering state variable of the vehicle is estimated to approach to a set value with respect to the limit cornering state variable until after delay time Δt, the operation start of the pre-pressure is carried out.

Figure 9:
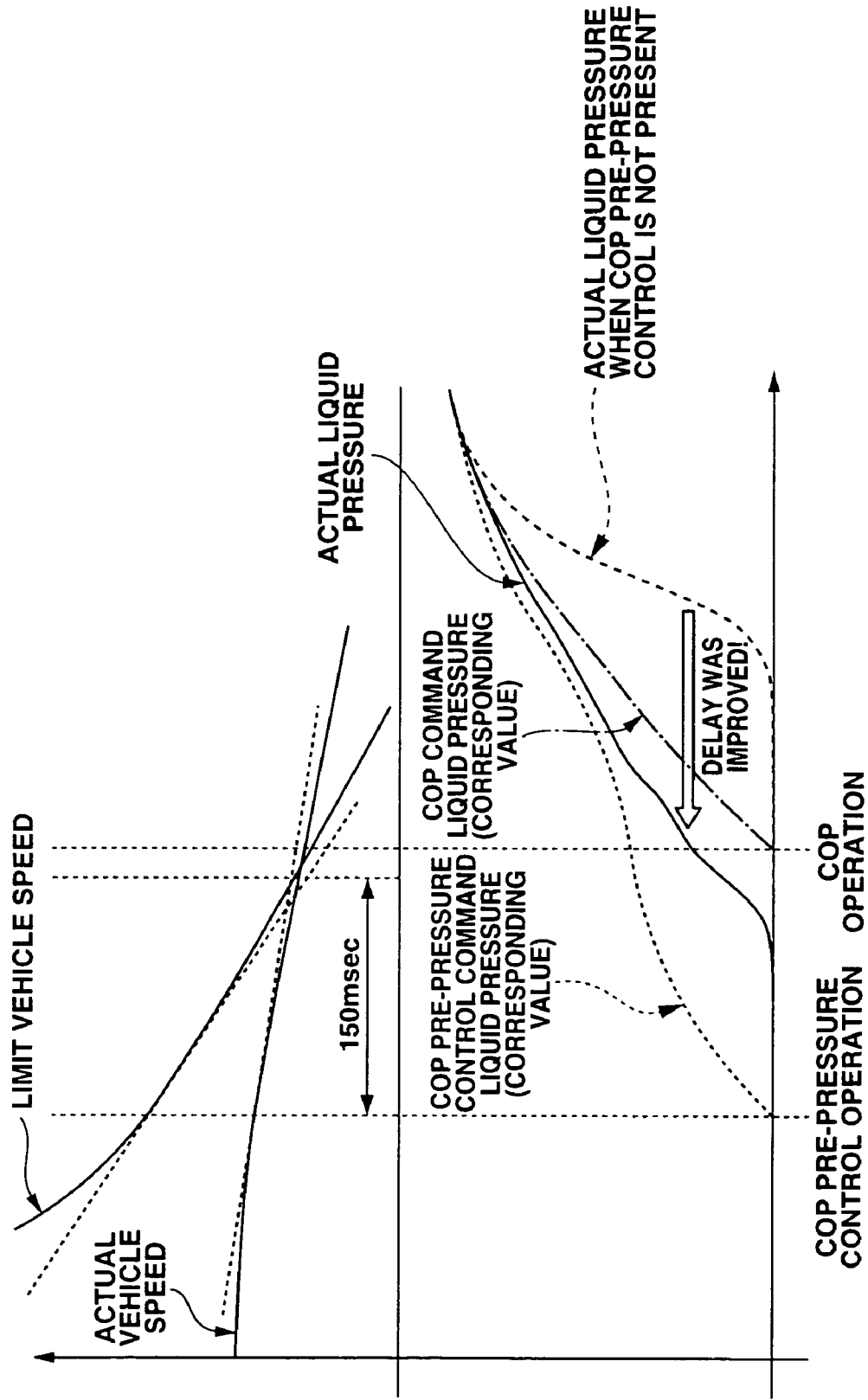
FIG. 9 is an example of a timing chart for explaining an operation of the braking force control apparatus in the first embodiment.

That is to say, the pre-pressure control of COP is operated at an earlier timing by Δt than a timing at which COP is stably started to be operated irrespective of the cornering state or target cornering state independently of the cornering state at that time and a target cornering state. Thus, the brake liquid is stored in the wheel cylinders of the respective road wheels and a liquid pressure responsive characteristic at an initial time of the COP operation is remarkably improved. FIG. 9 shows an example of the timing chart of the control based on the first preferred embodiment.

Figure 10:
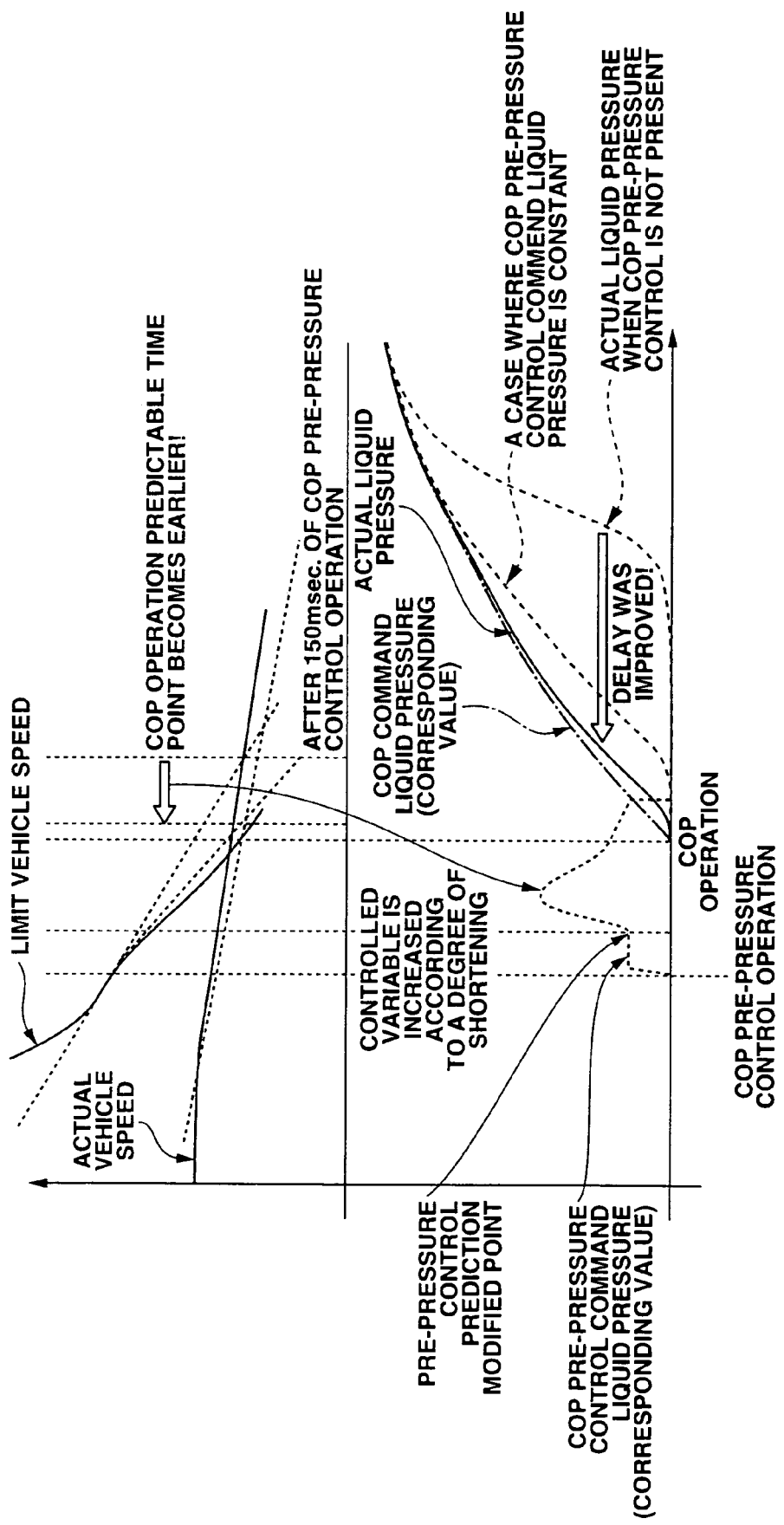
FIG. 10 is an example of a timing chart for explaining an operation of the braking force control apparatus in the first embodiment.

In addition, in the first embodiment, in a case, where, after the pre-pressure control of COP is operated, the actual cornering state variable of the vehicle reaches to the braking operation threshold value having a slight margin for the limit cornering (turning) state variable and it is predicted that the COP is started to be operated, a controlled variable of the COP pre-pressure control is enlarged so that a pressure boosting speed in the pre-pressure control of COP (or a flow speed of the brake liquid) becomes large (fast), as shown in an example of a timing chart of FIG. 10.

That is to say, at a time point of start of the COP pre-pressure control operation, it is predicted that COP is operated after time Δt from the calculated value of the limit cornering state variable, its variation speed, the actual cornering state variable, and its variation speed at that timing. For example, however, in a case where the variation speed of the limit cornering state variable becomes larger (faster) than that at the start time of the COP pre-pressure control, COP is operated at an earlier timing than the time passage of Δt. Because of this, there is often a case where the actual cornering state variable of the vehicle is in excess of the braking operation threshold value having the slight margin for the limit cornering state variable.

However, in this embodiment, even if, for example, the variation speed of the limit cornering state variable becomes larger (faster) than that during the COP pre-pressure control operation start time and COP is operated at the earlier timing than the initially expected, a command liquid pressure in the pre-pressure control for COP is enlarged to further increase the pressure boosting speed. Thus, even if COP is operated at the earlier timing than the time passage of Δt, it becomes possible to approach to the pre-pressure application state at the operation initial state more ideally.

In addition, when the above-described processing is carried out, the command liquid pressure is set to small during an ordinary COP pre-pressure control. In other words, a drive current of pump-motor 14 is set to be small so that low noise and low power consumption are achieved. The braking force of pump motor 14 is generated at minimum only if an abrupt pre-pressure application needs to be achieved so that it is possible to increase a pre-pressure effect. That is to say, a compatibility between the low noise and an improvement of the responsive characteristic can be achieved.

Figure 11:
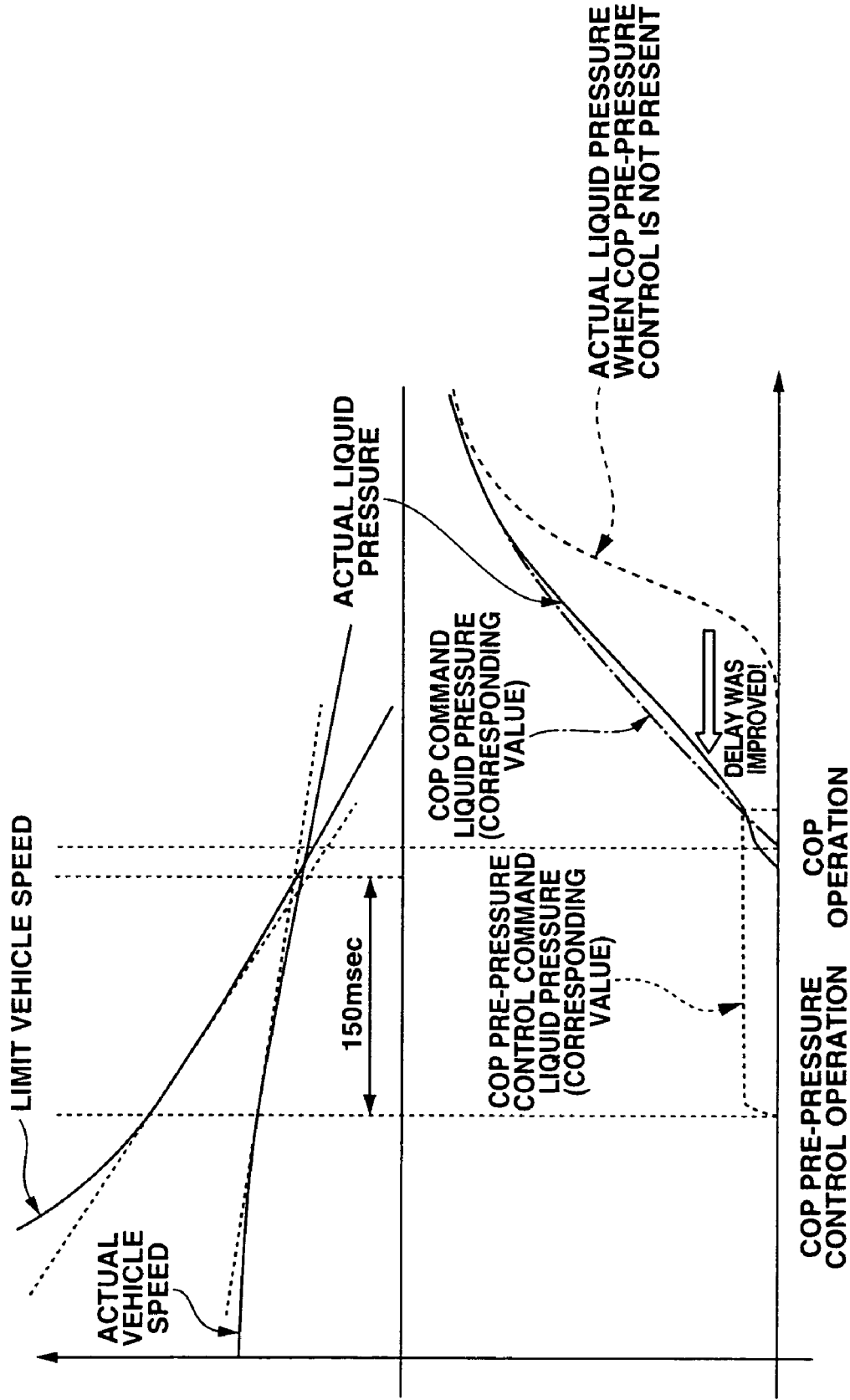
FIG. 11 is an example of a timing chart for explaining an operation of the braking force control apparatus in the first embodiment.

In this embodiment, a maximum value of the brake pressure during the pre-pressure control until COP is operated is a liquid pressure that the vehicle driver does not feel the deceleration, as shown in an example of the timing chart of FIG. 11. That is to say, a timing at which the deceleration should naturally be generated is when COP is operated at a time at which the actual cornering state variable of the vehicle is in excess of the braking operation threshold value and is approaching to the limit cornering state. If, during the pre-pressure control, the deceleration such that the driver feels the deceleration is generated, a, so-called, earlier operation sensation is supposed to be given to the driver. However, in this embodiment, it becomes possible to raise the liquid pressure of each wheel cylinder instantaneously at the required timing as described above without giving the driver an unpleasant feeling such that the braking control is operated at the earlier timing by time Δt.

For example, a minimum liquid pressure at which each brake pad can be determined to be contacted with the corresponding rotor is generated at a time point at which COP is operated. That is to say, conventionally, the reason that a dead time (delay time) Δt from a time at which COP is started to be operated is generated is that a time lag for the brake liquid to be filled in each wheel cylinder is present from a time at which pump motor 14 is activated to a time at which each brake pad is contacted with the corresponding rotor. In this embodiment, however, the deceleration to be felt by the driver is generated from the timing at which the COP is operated and each pad can assuredly be contacted with the corresponding rotor and the liquid pressure can be raised instantaneously without time delay at a timing (a time point at which the target cornering state variable is intersected with the actual state variable) at which the deceleration of the COP naturally should be generated without feeling of the earlier operation sensation by the driver.

In this embodiment, the pre-pressure control is not activated during the operation of brake pedal 21 by a vehicle driver. It is noted that the pre-pressure control may be stopped in a case where brake pedal 21 is manipulated during the operation of the pre-pressure control. That is to say, since, during the operation of brake pedal 21, the liquid pressure is applied to the wheel cylinders, it is not necessary to operate the pre-pressure control of COP. Therefore, the number of times the actuator is operated can unnecessarily be prevented from increasing due to a non-operation of the pre-pressure control. In addition, an unpleasant feeling which is given to the driver during the operation (or manipulation) of brake pedal 21 due to the pre-pressure control operation for COP can effectively be prevented.

In this embodiment, in a case where the other braking force control section is activated in which the liquid pressure is provided for the wheel cylinders to perform the braking force control, the pre-pressure for COP is not operated. That is to say, in a case where another braking force automatic providing apparatus is activated, the liquid pressure is applied to the respective wheel cylinders so that it is not necessary to operate the pre-pressure control for COP. Thus, since the pre-pressure control is not operated, the pre-pressure control of COP is not unnecessarily operated and is not interfered with the other braking force control. Consequently, a stable management of the braking force control can be achieved.

Figure 12:
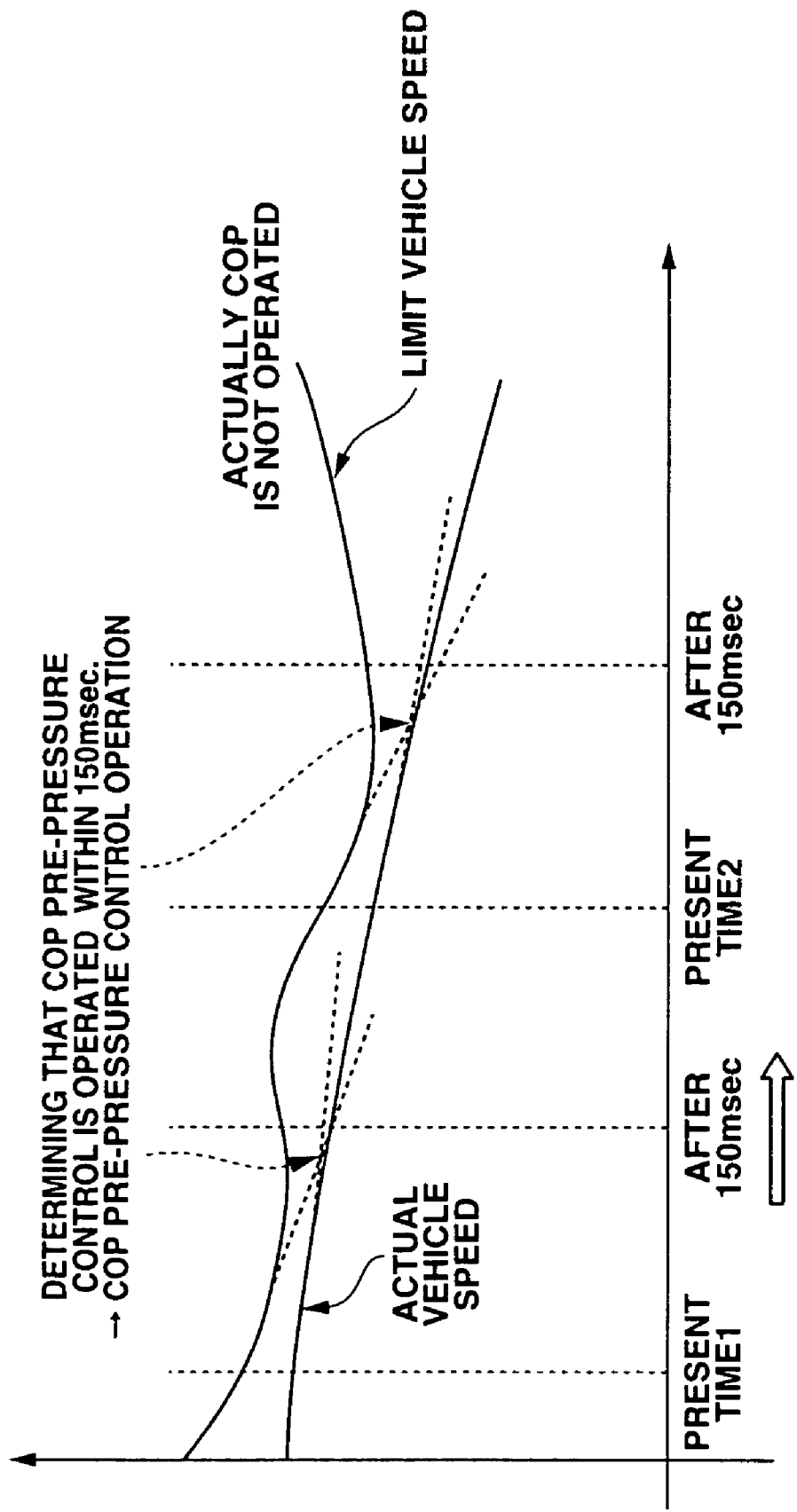
FIG. 12 is an example of a timing chart for explaining an operation of the braking force control apparatus in the first embodiment.

In this embodiment, in a case where the variation speed of the limit cornering state variable is equal to or below a certain threshold value as shown in a timing chart of FIG. 12, the pre-pressure control for COP is not activated. That is to say, in a case where the vehicle is cornering in the vicinity to the COP operation threshold value, the target cornering state variable approaches to the actual cornering state variable. Hence, there is a possibility that the pre-pressure control of COP repeats the operation(ON)/non-operation (OFF). However, in this embodiment, in a case where the target cornering state variable is moderately shifted in the vicinity to the braking operation threshold value, the pre-pressure control of COP is not operated. Hence, the repetitive occurrences of activation (ON) and deactivation (OFF) of COP pre-pressure control can be prevented.

In this embodiment, in a case where an absolute value of the steering angle is equal to or below a certain threshold value (it is preferable that a region which is determined as a substantially straight run and this threshold value may be varied according to the vehicle speed), the pre-pressure control of COP is not operated. That is to say, when the vehicle is running on a straight line or almost running on a straight line travel, a straight running state is maintained while the driver gives a minute corrective steering to the steering wheel of the vehicle. In the vicinity to a steering neutral point, a steering reactive force is small and a steering speed of the corrective steering often becomes instantaneously large. If such a steering speed state as described above is determined to be continued after time Δt, the pre-pressure control of the COP is often unnecessarily operated. However, in this embodiment, in the straight run state in which the steering angle is small (narrow), the pre-pressure control of COP is not activated (operated). Thus, an erroneous operation of COP pre-pressure control in the above-described running situation can be prevented from occurring.

In this embodiment, as the (vehicular outside) external temperature becomes lower, the above-described time Δt becomes larger (longer). In a case where the external (vehicular outside) temperature becomes low, a viscosity of a brake liquid becomes high. A time it takes to apply the liquid pressure to each wheel cylinder becomes long. Thus, in a case where time Δt is constant, in an extremely low temperature region, at the COP operation timing, the liquid pressure is not raised to a desired wheel cylinder liquid pressure. In this embodiment, however, as the external air temperature becomes lower, time Δt becomes long. The pre-pressure control is operated at the earlier timing. Thus, irrespective of the external air temperature, a sufficient pre-pressure application can be achieved during the COP operation.

In addition, in this embodiment, as a power supply voltage to drive pump 15 and various valves becomes lower, the above-described time Δt is made larger (longer). That is to say, in a case where the power supply voltage is low, the current to drive pump motor 14 tends to become insufficient. As compared with a high power supply voltage, a time it takes to apply the liquid pressure to wheel cylinders becomes longer than the case where the power supply voltage is high. Hence, in a case where time Δt is constant, the liquid pressure may not be raised to a desired wheel cylinder liquid pressure at the COP operation timing in a low voltage power supply region. In this embodiment, however, as the power supply voltage becomes lower, time Δt becomes larger (longer). In other words, at the earlier timing, the pre-pressure control for COP is operated. Thus, the sufficient pre-pressure application can be achieved during the COP operation even if the power supply voltage is low.

In this embodiment, the pre-pressure control is carried out when it is predicted that the cornering state after time Δt approaches to the limit cornering state and is in excess of braking operation threshold value and the control is transferred to COP control at a stage at which the cornering state of the vehicle is actually in excess of the braking operation threshold value. However, the present invention is not limit to this. For example, at a stage at which it is predicted that the cornering state of the vehicle approaches to the limit cornering state after time Δt and becomes in excess of the braking operation threshold value, COP control may be started without execution of the pre-pressure control. Even in this case, in a case where it is estimated that the cornering state of the vehicle is not in excess of the braking operation threshold value after the time passage of Δt, COP control is stopped.

In the above-described embodiment, braking operation threshold value kVL is used as the limit cornering state variable and the actual vehicle speed is used as the actual cornering state variable. However, the present invention is not limited to this. These may be determined by obtaining the vehicular cornering state using at least one of a vehicular yaw angle, a yaw rate, a yaw acceleration, a roll angle, a roll rate, a roll acceleration, a longitudinal-and-lateral G (Gravity), the cornering radius, the steering angle, a steering angular velocity, and a traffic lane information by means of a road recognition system such as a camera, a navigation system, and a road infrastructure. In addition, in a case where it is possible to determine a rough road such as to disturb the vehicular motion or steering, a strong filter may be applied to each parameter of COP pre-pressure control or a pre-pressure logic intervention may be stopped in order to prevent the erroneous operation of COP pre-pressure control due to noises of control variables.

Figure 13:
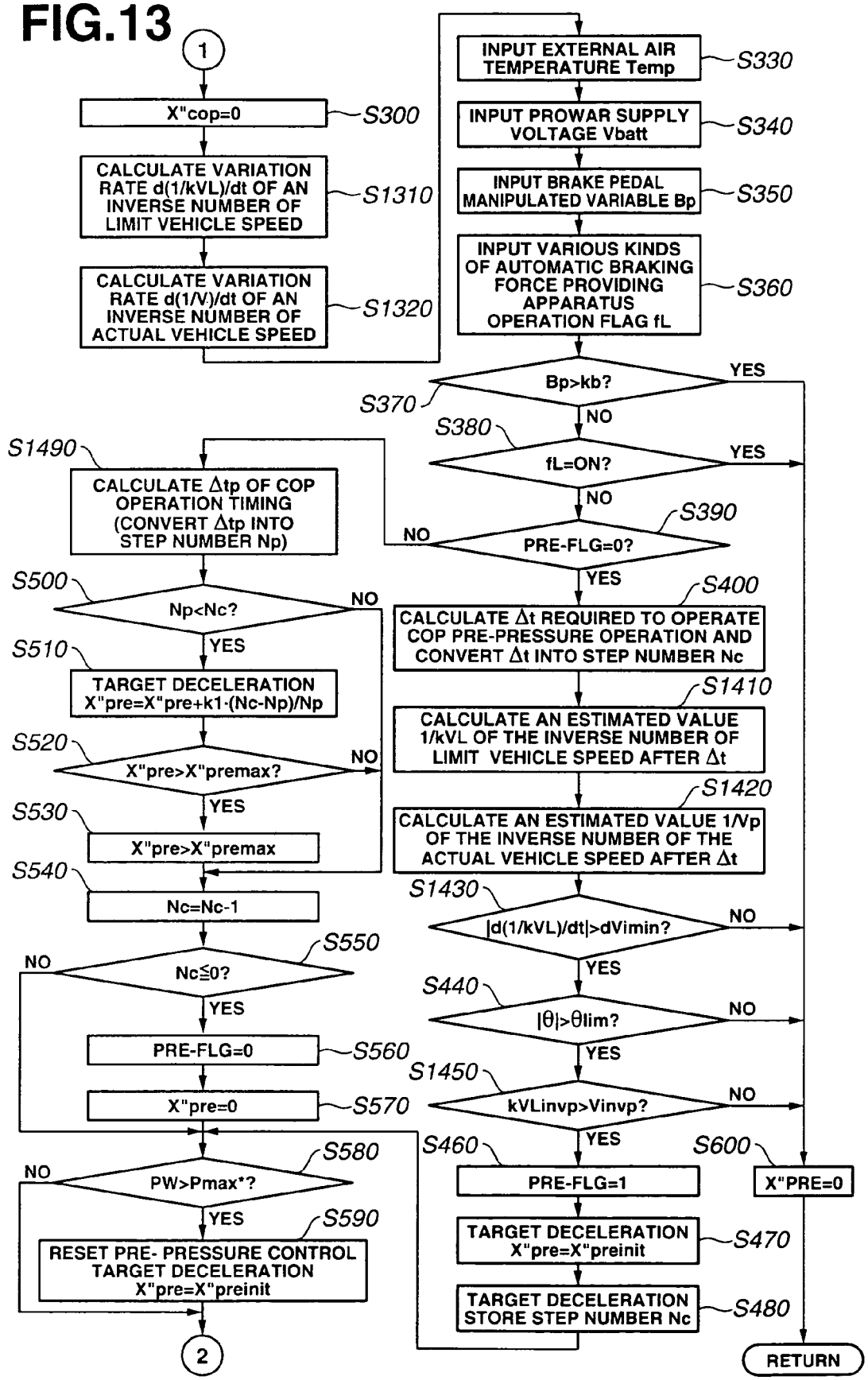
FIG. 13 is a processing flow executed by the COP controller in a case of the braking force control apparatus in a second preferred embodiment according to the present invention.

Next, a braking force control apparatus in a second preferred embodiment will be described below. The same parts as the above-described first embodiment will be described with like reference numerals. A basic structure of the second embodiment is generally the same as in the first preferred embodiment. As shown in the flowchart shown in FIG. 13, the processing of pre-pressure control portion in COP control section 30 (refer to FIG. 4) is different. For the same steps as in FIG. 13 as those carried out in FIG. 4, the same step numbers are assigned. As shown in FIG. 13, the contents of processing as steps S310, S320, S410 through S430, S450, and S490 are different. That is to say, at step S1310, COP controller 30 calculates an inverse number kVLinv (=1/kVL) of braking operation threshold value kVL and its time variation rate d(kVinv)/dt. In addition, the following processing is carried out when determining whether the cornering state variable after time Δt is in excess of braking operation threshold value kVL. That is to say, COP controller 30 calculates inverse number kVLinvp of braking operation threshold value kVL after time Δt on the basis of the following equation and the routine goes to a step S1430.

$$kVLinvp = kVLinv + d(kVLinv)/dt \times \Delta t$$

At step S1420, COP controller 30 calculates an inverse number Vinvp after time Δt using the following equation and the routine goes to a step S1430.

$$Vinvp = Vinv + d(Vinv)/dt \times \Delta t$$

At step S1430, COP controller 30 determines whether an absolute value of variation speed d(kVin)/dt of the inverse number of braking operation threshold value kVL is in excess of certain value dVimin.

At step S1430, COP controller 30 determines whether the absolute value of variation speed d(kVinv)/dt of the inverse number of braking operation threshold value kVL is in excess of certain value dVimin. This serves to prevent the frequent repetition of COP pre-pressure control between ON state and OFF state in a case where the vehicle is traveling maintaining in the vicinity to the operation threshold value of COP. On the other hand, if |d(kVinv)/dt|≦dVimin, the pre-pressure control is not operated but the routine goes to step S600.

At step S1450, COP controller 30 determines whether the pre-pressure control of COP is operated or not. If kVLinvp is in excess of Vinvp after time Δt, it is necessary to operate the pre-pressure control for COP and the routine goes to step S460. If not necessary, the routine goes to a step S600 and the pre-pressure control is not operated. If the pre-pressure control of COP is already operated, the routine goes to a step S1490. At step S1490, COP controller 30 calculates after what second from the present step it is predicted that the COP is operated on the basis of the following equation. This is set as Δtp.

$\Delta tp = (Vpinv - kVLinv)/(d(kVLinv)/dt - d(Vin)/dt)$

Since, in the same way as time Δt, Δtp is handled as the step number within the logic, Δtp is handled as the step number. Thus, Δtp is divided by the control period to convert it into Np. The other steps are the same as those described in the first embodiment.

Figure 14:
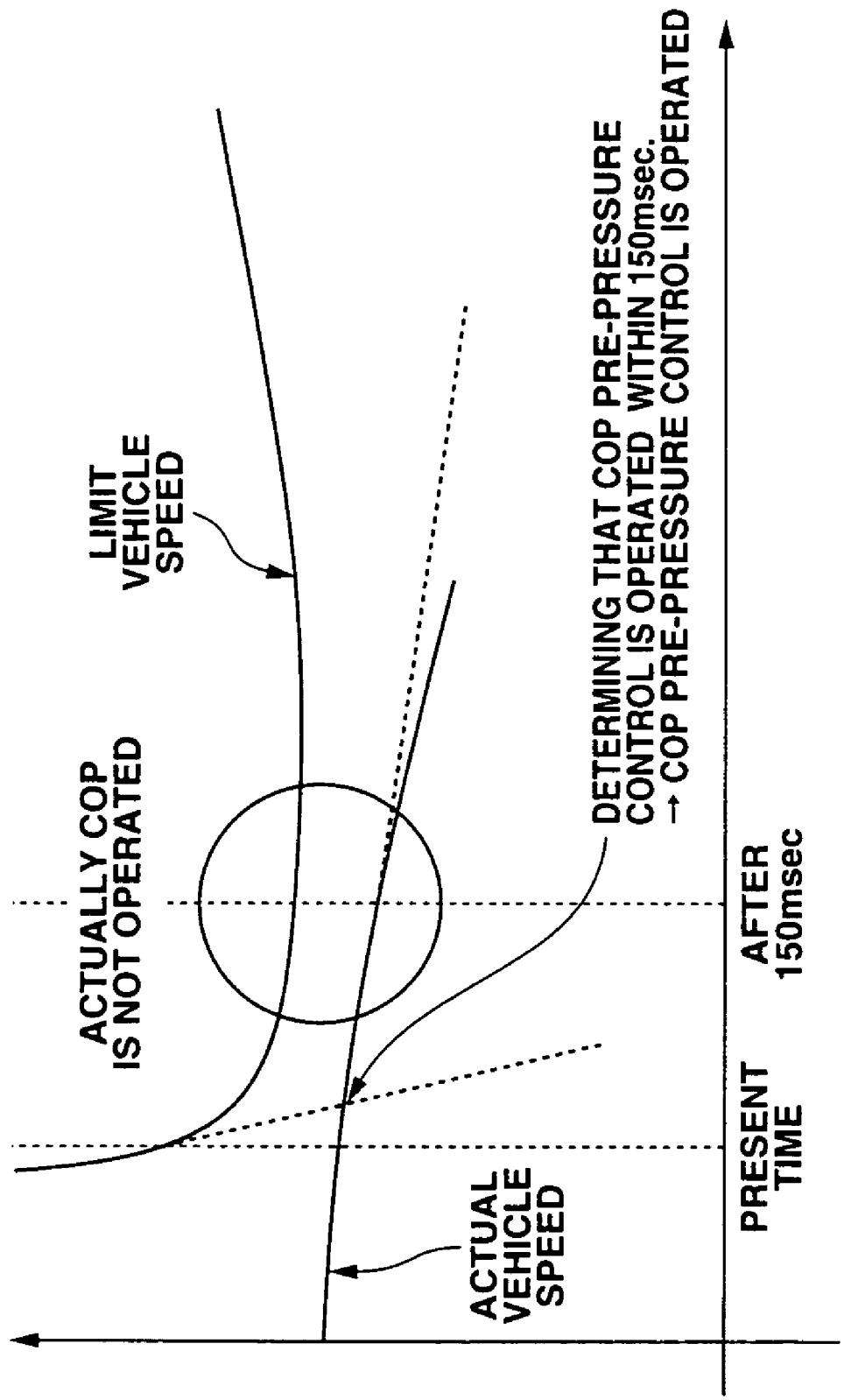
FIG. 14 is an example of a timing chart for explaining an operation of the braking force control apparatus in the second embodiment shown in FIG. 13.

That is to say, the limit cornering state variable up to which the vehicle can stably be traveled often indicates a value corresponding to an infinity when the vehicle is traveling on the straight road such as the limit cornering vehicle speed. When the limit cornering state variable after Δt is estimated using such a limit cornering state variable is largely varied when the vehicle is transferred to the slight cornering state from the straight run state. Thus, the thereafter limit cornering state variable variation cannot highly accurately be predicted as shown in FIG. 14.

Figure 15:
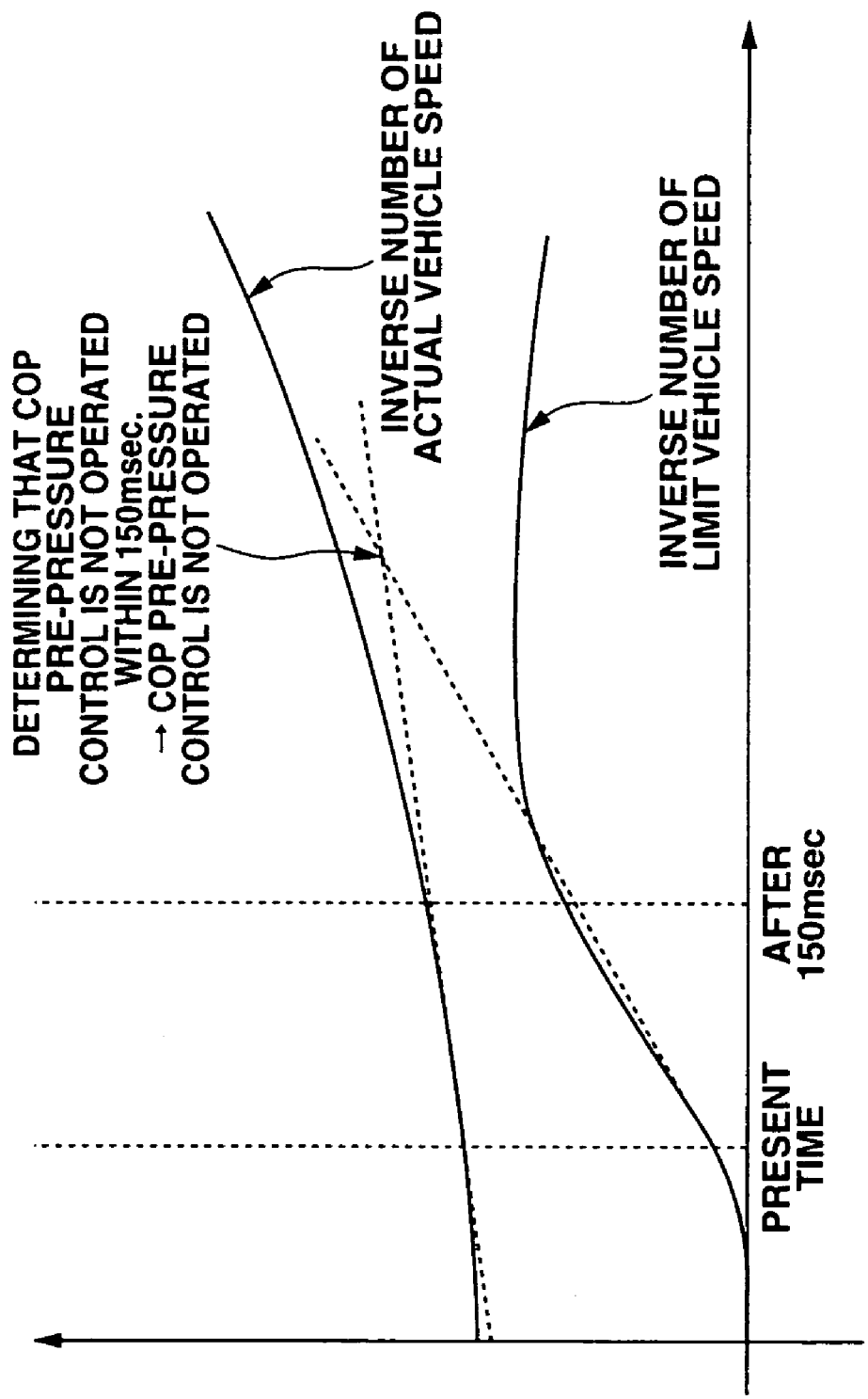
FIG. 15 is an example of a timing chart for explaining an operation of the braking force control apparatus in the second embodiment shown in FIG. 13.

On the other hand, the limit cornering state variable becomes a value increased from zero as shown in FIG. 15 using the inverse number as described in the preferred embodiment. It becomes possible to predict accurately the limit cornering state variable after time Δt through a simple prediction technique such as a linear approximation. In addition, since the limit cornering state variable does not become infinity (if a denominator becomes zero, an infinity is resulted), a gradient of the limit cornering state variable is not discontinued when a limiter is used. In this region, the accurate prediction can be achieved. The other structure, the action, and the advantages are the same as those described in the first embodiment. It is noted that the pre-pressure control corresponds to the preliminary brake control.

The entire contents of a Japanese Patent Application No. 2004-171547 (filed in Japan on Jun. 9, 2004) are herein incorporated by reference. The scope of the invention is defined with reference to the following claims.

What is claimed is:

1. A braking force control apparatus for an automotive vehicle, comprising:
a cornering stability control section that calculates a target deceleration required to maintain a vehicular stability cornering when determining that a cornering state variable of the vehicle is in excess of a braking operation threshold value which has a slight margin for a limit cornering state variable up to which the vehicle is enabled to travel stably and provides a braking force in accordance with the target deceleration for the vehicle; and a cornering limit estimating section that estimates whether the cornering state variable of the vehicle is in excess of the braking operation threshold value after a predetermined delay time is elapsed from a present time, the cornering stability control section being configured to start a provision of the braking force for the vehicle when the cornering limit estimating section estimates that the cornering state variable of the vehicle is in excess of the braking operation threshold value after the predetermined delay time is elapsed from the present time.

2. A braking force control apparatus for an automotive vehicle as claimed in claim 1, wherein the cornering stability control section provides a braking pressure in accordance with the target deceleration for a wheel cylinder provided on each road wheel of the vehicle to provide the braking force for the vehicle and wherein the cornering stability control section comprises a preliminary brake control section that provides a predetermined braking pressure for each wheel cylinder at least one of until the predetermined delay time is elapsed and until an actual cornering state variable of the vehicle is determined to be in excess of the braking operation threshold value when the cornering limit estimating section estimates that the cornering state variable of the vehicle is in excess of the braking operation threshold value.

3. A braking force control apparatus for an automotive vehicle as claimed in claim 2, wherein the braking force control apparatus further comprises a limit arrival time estimating section that estimates an arrival estimating time (Δtp) from the present time to a time at which the cornering state variable of the vehicle is in excess of the braking operation threshold value and wherein the preliminary brake control section enlarges a controlled variable of the preliminary brake control to provide the braking pressure when determining that the cornering state variable of the vehicle is in excess of the braking threshold value at an earlier time than a time passage of the predetermined delay time from a start of a preliminary braking on the basis of an estimation result of the limit arrival time estimating section.

4. A braking force control apparatus for an automotive vehicle as claimed in claim 2, wherein the cornering limit estimating section estimates whether the cornering state variable of the vehicle is in excess of the braking operation threshold value after the predetermined time is elapsed from the present time on the basis of an inverse number of the cornering state variable and the inverse number of the braking operation threshold value.

5. A braking force control apparatus for an automotive vehicle as claimed in claim 2, wherein a maximum value of a control pressure in the preliminary brake control section has a magnitude at which a vehicle driver does not feel the deceleration.

6. A braking force control apparatus for an automotive vehicle as claimed in claim 2, a maximum value of a control pressure in the preliminary brake control section is a liquid pressure by which a brake pad of a brake unit for each road wheel is only contacted with a rotor without transmitting a force.

7. A braking force control apparatus for an automotive vehicle as claimed in claim 2, wherein the preliminary brake control section stops the provision of the braking force for the vehicle when determining that a brake operation by a vehicle driver is carried out.

8. A braking force control apparatus for an automotive vehicle as claimed in claim 2, wherein the braking force control apparatus further comprises another braking force control section that provides the braking force for the vehicle irrespective of an braking operation by a vehicle driver, the other braking force control section being another than the cornering stability control section, and the preliminary brake control section stops a provision of the braking pressure when determining that the braking force is provided for the vehicle by the other braking force control section.

9. A braking force control apparatus for an automotive vehicle as claimed in claim 2, wherein the preliminary brake control section stops a provision of the braking pressure when determining that a variation speed of the limit cornering state variable is equal to or below a predetermined variation speed.

10. A braking force control apparatus for an automotive vehicle as claimed in claim 2, wherein the preliminary braking control section stops a provision of the braking pressure when determining that an absolute value of a vehicular steering angle is equal to or narrower than a predetermined steering angle.

11. A braking force control apparatus for an automotive vehicle as claimed in claim 1, wherein the predetermined delay time is varied in accordance with an external air temperature of the vehicle and, as the external air temperature becomes lower, the predetermined delay time becomes longer.

12. A braking force control apparatus for an automotive vehicle as claimed in claim 1, wherein the cornering stability control section comprises an actuator which is driven by an electric power supply, the predetermined delay time is varied in accordance with the power supply, and wherein as a voltage of the power supply becomes lower, the predetermined delay time becomes longer.

13. A braking force control apparatus for an automotive vehicle as claimed in claim 2, wherein the cornering stability control section comprises: a cornering state detecting section that calculates a present cornering radius on the basis of a present vehicle body speed and a present vehicle body lateral acceleration; and a cornering limit calculating section that calculates a limit cornering vehicle speed on the basis of the present cornering radius and a limit vehicle body lateral acceleration determined according to the vehicle.

14. A braking force control apparatus for an automotive vehicle as claimed in claim 13, wherein the cornering stability control section comprises: a cornering stability control operation determining section that determines whether a cornering stability control should be operated depending upon whether the vehicle body speed is higher than the braking operation threshold value which is slightly smaller than the limit cornering speed; and a target deceleration calculating section that calculates the target deceleration for the cornering stability control on the basis of the vehicle body speed, the cornering radius, and a limit cornering radius when the cornering stability control operation determining section determines that the cornering stability control should be operated; and a time passage calculating section that determines whether the predetermined time is elapsed from a start of the preliminary brake control; a final target deceleration determining section that determines a final deceleration by determining one of the target deceleration for the cornering stability control and the target deceleration for the preliminary brake control, which is larger than the other, when the time passage calculating section determines that the predetermined time is elapsed.

15. A braking force control apparatus for an automotive vehicle as claimed in claim 14, wherein the cornering stability control section comprises: a preliminary brake control operation determining section that determines whether the preliminary brake control is being operated; a delay time calculating section that sets the predetermined delay time which is a sufficient time for the brake liquid to be filled within each wheel cylinder and a wheel cylinder liquid pressure is raised without delay when the preliminary brake control operation determining section determines that the preliminary brake control is not being operated; a brake operation threshold value calculating section that calculates the brake operation threshold value after the predetermined delay time on the basis of the braking operation threshold value, a time differentiation of the braking operation threshold value multiplied by the predetermined time delay; and an actual vehicle speed calculating section that calculates an actual vehicle speed after the predetermined delay time on the basis of the present vehicle speed, a time differentiation of the present vehicle speed, and the predetermined delay time.

16. A braking force control apparatus for an automotive vehicle as claimed in claim 15, wherein the cornering stability control section comprises: a limit cornering estimating section that determines whether the preliminary brake control should be operated depending on whether the vehicle speed after the predetermined time is in excess of the braking operation threshold value; and a target deceleration calculating section that sets the target deceleration for the preliminary brake control as an initial value when the limit cornering estimating section determines that the preliminary brake control should be operated determining that the vehicle speed after the predetermined delay time is in excess of the braking operation threshold value.

17. A braking force control apparatus for an automotive vehicle as claimed in claim 16, wherein the cornering stability control section comprises: a limit arrival time estimating section that predictably calculates an arrival estimating time ($\Delta tp$) from the present time it is predicted that the cornering stability control is operated from a time variation rate of the braking operation threshold value and a variation rate of the actual vehicle speed, when the preliminary brake control operation determining section determines that the preliminary brake control is being operated.

18. A braking force control apparatus for an automotive vehicle as claimed in claim 17, wherein the cornering stability control section further comprises a first comparing section that compares Np which is a division of the arrival estimating time ($\Delta tp$) by a control period with Nc which is a division of the predetermined delay time ($\Delta t$) by the control period and a target deceleration correcting section that corrects the target deceleration for the preliminary brake control to be enlarged on the basis of one control period previous target deceleration and a difference between the arrival estimating time and the predetermined delay time when a comparison result of the first comparing section is Np<Nc.

19. A braking force control apparatus for an automotive vehicle as claimed in claim 18, wherein the cornering stability control section further comprises a second comparing section that determines whether the target deceleration for the preliminary brake control is in excess of a limiter, the target deceleration is changed to limiter which is a value corresponding to a maximum deceleration which is estimated for a vehicle driver not to feel the deceleration when a comparison result of the second comparing section is that the target deceleration for the preliminary brake control is smaller than the limiter.

20. A braking force control apparatus for an automotive vehicle as claimed in claim 19, wherein the cornering stability control section further comprises: a predetermined time passage determining section that determines whether the predetermined delay time is elapsed from a time at which the preliminary brake control is started; a liquid pressure determining section that determines whether a wheel cylinder liquid pressure generated by the preliminary brake control is larger than a set value, the set value being a liquid pressure value by which a brake pad of a brake unit for each road wheel is only contacted with a rotor without transmitting a force, when the predetermined time passage determining section determines that the predetermined delay time ($\Delta t$) is not elapsed; and a resetting section that resets target deceleration for the preliminary brake control to the initial pressure when the liquid pressure determining section determines that each wheel cylinder liquid pressure is larger than the set value and wherein, after executions by the liquid pressure determining section and the resetting section, a control is transferred to the final target deceleration determining section.

21. A braking force control method for an automotive vehicle, comprising:
calculating a target deceleration required to maintain a vehicular stability cornering, and in accordance with which a braking force is provided when determining that a cornering state variable of the vehicle is in excess of a braking operation threshold value which has a slight margin for a limit cornering state variable up to which the vehicle is enabled to travel stably;

estimating whether the cornering state variable of the vehicle is in excess of the braking operation threshold value after a predetermined delay time is elapsed from a present time; and starting to provide the braking force for the vehicle when estimating that the cornering state variable of the vehicle is in excess of the braking operation threshold value after the predetermined time is elapsed from the present time.

22. A braking force control apparatus for an automotive vehicle, comprising:

cornering stability control means for calculating a target deceleration required to maintain a vehicular stability cornering when determining that a cornering state variable of the vehicle is in excess of a braking operation threshold value which has a slight margin for a limit cornering state variable up to which the vehicle is enabled to travel stably and for providing a braking force in accordance with the target deceleration for the vehicle; and a cornering limit estimating means for estimating whether the cornering state variable of the vehicle is in excess of the braking operation threshold value after a predetermined delay time is elapsed from a present time, the cornering stability control means being configured to start a provision of the braking force for the vehicle when the cornering limit estimating means estimates that the cornering state variable of the vehicle is in excess of the braking operation threshold value after the predetermined delay time is elapsed from the present time.

* * * * *